US006922712B2

(12) United States Patent
Pelton et al.

(10) Patent No.: US 6,922,712 B2
(45) Date of Patent: Jul. 26, 2005

(54) APPARATUS, METHODS, AND COMPUTER PROGRAM PRODUCTS FOR ACCURATELY DETERMINING THE COEFFICIENTS OF A FUNCTION

(75) Inventors: Walter E. Pelton, 3584 Lancelot Ct., Fremont, CA (US) 94536; Adrian Stoica, Pasadena, CA (US)

(73) Assignee: Walter E. Pelton, Fremont, CA (US)

(*) Notice: Subject to any disclaimer, the term of this patent is extended or adjusted under 35 U.S.C. 154(b) by 696 days.

(21) Appl. No.: 09/793,663

(22) Filed: Feb. 26, 2001

(65) Prior Publication Data

US 2001/0051966 A1 Dec. 13, 2001

Related U.S. Application Data

(60) Provisional application No. 60/185,346, filed on Feb. 26, 2000, and provisional application No. 60/201,609, filed on May 3, 2000.

(51) Int. Cl.[7] .............................................. G06F 17/14
(52) U.S. Cl. ...................................................... 708/403
(58) Field of Search ................................ 708/403–405

(56) References Cited

U.S. PATENT DOCUMENTS

| | | |
|---|---|---|
| 3,746,848 A | 7/1973 | Clary |
| 3,803,393 A | 4/1974 | Wang |
| 4,023,028 A | 5/1977 | Dillard |
| 4,225,937 A | 9/1980 | Perreault et al. |
| 4,581,715 A | 4/1986 | Hyatt |
| 4,868,776 A | 9/1989 | Gray et al. |
| 4,929,954 A | 5/1990 | Elleaume |
| 5,007,009 A | 4/1991 | Azetsu |
| 5,233,551 A | 8/1993 | White |
| 5,245,564 A | 9/1993 | Quek et al. |
| 5,504,690 A | 4/1996 | Kageyama et al. |
| 5,515,308 A | 5/1996 | Karp et al. |
| 5,563,818 A | 10/1996 | Agarwal et al. |
| 5,784,307 A | 7/1998 | Sheaffer |

(Continued)

FOREIGN PATENT DOCUMENTS

| | | |
|---|---|---|
| EP | 0 075 745 A2 | 4/1983 |
| EP | 0 080 266 A2 | 6/1983 |
| EP | 0 372 566 A2 | 6/1990 |
| EP | 0 441 121 A2 | 8/1991 |
| WO | WO 99/63451 A1 | 12/1999 |
| WO | WO 00/67146 A1 | 11/2000 |

OTHER PUBLICATIONS

N. Rama Murthy and M.N.S. Swamy, *On The Real–Time Computation Of DFT And DCT Through Systolic Architectures,* IEEE Transactions On Signal Processing, Apr. 1994, pp. 988–991, vol. 42, No. 4.

*A Review of the Discrete Fourier Transform,* Part 1: *Manipulating the Powers of Two,* G. M. Blair, Electronics and Communication Engineering Journal, Institute of Electrical Engineers, London, vol. 7, No. 4, Aug. 1, 1995, pp. 169–177.

(Continued)

*Primary Examiner*—D. H. Malzahn
(74) *Attorney, Agent, or Firm*—Alston & Bird LLP

(57) ABSTRACT

The present invention provides apparatus, methods, and computer program products for providing coefficients of a function representative of a signal. In one embodiment, the apparatus, methods, and computer program products of the present invention, taking advantage of the independence of samples, provide complete sets of coefficients of the function as each sample is received and corrects the updated coefficients for accuracy by applying a rotating reference system. As such, the apparatus, methods, and computer program products of the present invention are capable of providing accurate coefficients with decreased latency. In another, embodiment, the apparatus, methods, and computer program products of the present invention use learning models to derive complete sets of coefficients of functions as each sample is received. In another embodiment, the apparatus, methods, and computer program products of the present invention use learning models to determine apparatus, methods, and computer program products for generating coefficients of functions.

24 Claims, 12 Drawing Sheets

U.S. PATENT DOCUMENTS

| | | | |
|---|---|---|---|
| 5,818,745 A | | 10/1998 | Sheaffer |
| 5,847,977 A | | 12/1998 | Jhung |
| 6,038,579 A | * | 3/2000 | Sekine ................. 708/400 |
| 6,127,863 A | | 10/2000 | Elliott |
| 6,240,338 B1 | | 5/2001 | Peterson |
| 6,240,433 B1 | | 5/2001 | Schmookler et al. |
| 6,263,257 B1 | * | 7/2001 | Aemmer ................. 700/139 |
| 6,304,887 B1 | | 10/2001 | Ju et al. |
| 6,434,583 B1 | * | 8/2002 | Dapper et al. ........... 708/409 |
| 6,496,795 B1 | * | 12/2002 | Malvar ................. 704/203 |
| 6,735,610 B1 | | 5/2004 | Pelton |

OTHER PUBLICATIONS

*Theory and Application of Digital Signal Processing,* L. R. Rabiner et al., Prentice–Hall, Inc., New Jersey, 1975, pp. 50–56 and 594–603, XP002141966.

*A Comparative Review of Real and Complex Fourier–Related Transforms,* O. K. Ersoy, Proceedings of the IEEE, US, IEEE, New York, vol. 82, No. 3, Mar. 1994, pp. 429–447.

*Numerical Methods,* Numerical Methods, XX, XX, G. Dahlquist et al., 1974, pp. 14–19, XP002116162.

* cited by examiner

APPARATUS, METHODS, AND COMPUTER PROGRAM PRODUCTS FOR ACCURATELY DETERMINING THE COEFFICIENTS OF A FUNCTION

CROSS-REFERENCE TO RELATED APPLICATIONS

The present application claims priority from U.S. Provisional Patent Application Ser. No. 60/185,346, entitled: METHODS AND APPARATUS FOR PROCESSING AND ANALYZING INFORMATION, filed on Feb. 26, 2000 and Ser. No. 60/201,609, entitled: METHODS AND APPARATUS DERIVED FROM LEARNING MODELS FOR PROCESSING AND ANALYZING INFORMATION filed May 3, 2000, the contents of both of these applications are incorporated herein by reference.

FIELD OF THE INVENTION

The present invention relates generally to the determination of coefficients of a function. More particularly, the apparatus, methods, and computer program products of the present invention relate to determining the coefficients of a function representative of an input signal as each sample of the signal is received so as to provide continuously updated coefficients.

BACKGROUND OF THE INVENTION

Signal processing is an important function of many electronic systems. In particular, in many electronic systems, data is transmitted in signal form. Further, some electronic systems analyze and monitor the operation of mechanical or chemical systems by observing the characteristics of signals, such as vibration signals and other types of signals, that are output from these systems. In light of this, methods have been developed to characterize signals such that information or data in the signal is available for data processing.

As one example, in many electronic systems, time domain signals are typically transformed to the frequency domain prior to signal processing. A typical method for converting signals to the frequency domain is performed using Fourier Transforms. The Fourier Transform of a signal is based on a plurality of samples of the time domain signal taken over a selected time period, known as the base frequency. Based on these samples of the signal the Fourier Transform provides a plurality of coefficients, where the coefficients respectively represent the amplitude of a frequency that is a multiple of the base frequency. These coefficients of the Fourier Transform, which represent the signal in the frequency domain, are then used by electronic systems in processing the signal.

Although Fourier Transforms are among some of the most widely used functions for processing signals, there are other functions that are either currently used or will be used in the future, as a better understanding of their applicability is recognized. These functions include Bessel functions, Legendre Polynomials, Tschebysheff Polynomials of First and Second Kind, Jacoby Polynomials, Generalized Laguerre Polynomials, Hermite Polynomials, Bernoulli Polynomials, Euler Polynomials, and a variety of Matrices used in Quantum Mechanics, Linear Analysis functions, wavelets and fractals just to name a few.

Although Fourier transforms and the other functions mentioned above are useful in determining characteristics of signals for use in data processing, there can be some drawbacks to their use. Specifically, application of these functions to signals is typically computationally intensive. This is disadvantageous, as it may require the use of specialized processors in order to perform data processing. Further, and even more importantly, the time required to perform the number of computations using these functions may cause an unacceptable delay for many data processing applications. In fact, a goal of many data processing systems is the ability to process data signals in real time, with no delay.

For example, the Fourier Series is defined as an infinite series of coefficients representing a signal. To transform a signal using a Fourier Series would require an infinite number of computations. To remedy this problem, many conventional data processing systems use Discrete Fourier Transforms (DFT), as opposed to the infinite Fourier Series. The DFT is the digital approximation to the Fourier Series and is used to process digitized analog information. Importantly, the DFT replaces the infinite series of the Fourier Series with a finite set of N evenly spaced samples taken over a finite period. The computation of the DFT therefore provides the same number of coefficients as the samples received, instead of an infinite number of samples required by the Fourier Series. As such, use of the DFT provides the most satisfactory current means to process the signal.

Because of the importance of reducing the time required to process signals, however, methods have been developed to further reduce the number of computations required to perform a DFT of a signal. Specifically, the DFT procedure computes each coefficient by a similar process. The process for a general coefficient is; multiply each sample by the sine or cosine of the normalized value of the independent variable times the angular rate and sum over all of the samples. This procedure defines N multiply-add steps for each of N coefficients, which in turn, equates to $N^2$ multiply-add computations per DFT. As many samples of a signal are typically required to perform an adequate approximation of the signal, the DFT of a signal is typically computational and time intensive.

One of the methods developed to reduce the number of computations is the butterfly method, which reduces the number of computations from $N^2$ to N times log (N). The butterfly method is based on the fact that many of the trigonometric values of the DFT are the same due to periodicity of the functions. As such, the butterfly method reduces the matrix associated with the DFT into N/2 two-point transforms (i.e., the transforms representing each coefficient $a_n$ and $b_n$). The butterfly method further reduces the redundant trigonometric values of the DFT.

Although the butterfly method reduces the number of computations over the more traditional DFT method, it also adds complexity to the Fourier transformation of a signal. Specifically, the butterfly method uses a complex method for addressing the samples of the signal and the matrix containing the functions. This complexity can require the use of specialized processors and increase time for computation of the Fourier Transform. By its nature, the butterfly is a batch process, which does not begin determination of the coefficients until after all of the samples have been received. Consequently, this method causes latency in the determination of the coefficients of the function, where the time between the arrival of the last sample and the availability of the coefficients is defined as the latency of the system.

Another approach to reducing the time required to process signals is described in U.S. patent application Ser. No. 09/560,221, filed Apr. 28, 2000, and entitled: "Apparatus, Methods And Computer Program Products For Determining The Coefficients Of A Function With Decreased Latency" and in PCT Application No. WO 00/67146, entitled: "Computation of Discrete Fourier Transform", published Nov. 9, 2000, the contents of which are incorporated herein by reference. Both of these patent applications were invented and are owned by Mr. Walter Pelton, who is also a co-inventor and assignee of the present application. Pelton's approach as described more fully in these applications reduces or eliminates the problem of latency for processing coefficients by using an important property of functions like the DFT to reduce the latency. This property is the independence of samples. In a set of samples being transformed in a DFT process, each sample makes a contribution to each coefficient based only on the sine or cosine of the applicable angle. Specifically, each of the coefficients of the DFT is the summation of the application of each sample to the sine and cosine functions associated with each coefficient. As each of the samples are related to each coefficient by addition, each sample is independent of the other samples and can be used to update the coefficients prior to receipt of the other samples.

Using Pelton's approach, a complete set of coefficients can be derived for a plurality of samples. Specifically, as each sample is received, the coefficient contributions for each sample is calculated. Also, the coefficient contributions are summed after they are calculated. After adding the coefficient contributions for the last sample of the plurality of samples, a complete set of coefficients is available for all of the samples. The time required to calculate and add the contribution of the last sample is typically small. Consequently, the latency of the Pelton approach is characteristically small.

In U.S. patent application Ser. No. 09/560,221 and PCT application WO 00/67146, a Sliding Aperture Fourier Transform (SAFT) is described, along with apparatus, methods, and computer program products for performing such transforms. Processing Sliding Aperture Fourier Transforms (SAFT) includes replacing the coefficient contributions of the oldest sample of the previous plurality of samples with the coefficient contributions of the next received sample. Using this new sample, SAFT yields a next set of coefficients that are available for output. As such, instead of generating a set of coefficients for each "batch" of samples, SAFT generates a set of coefficients each time a new sample is received. An important characteristic of the operation of SAFT is that SAFT uses the previously calculated coefficient contributions for samples that have been received. SAFT provides a complete set of coefficients for the batch of samples by subtracting the coefficient contributions for the oldest sample and adding the coefficient contributions for a new sample each time a new sample is received.

It is apparent that the Pelton approach and Sliding Aperture Fourier Transforms as described in WO 00/67146 can be used in numerous applications. A few of the advantages of the Pelton approach and the SAFT are: low or zero latency coefficient processing capabilities, reduced hardware requirements, simpler programming requirements, simpler electronic devices for implementation, to reduce the power consumption for electronically processing coefficients, and more information for the samples of data. However, there may be applications in which it may be desirable for SAFT, as described in U.S. patent application Ser. No. 09/560,221 and PCT Application WO 00/67146, to provide coefficients of greater accuracy.

Specifically, SAFT as described in these applications introduces an error in the calculated coefficients at the start of the process of subtracting the coefficient contribution of the oldest sample and adding the coefficient contribution of the new sample. Error may occur because the continuous processing of the coefficients causes a shift in the angle associated with each sample. For example, in DFT applications, a particular angle is associated with the first sample of a set of N samples, and that angle is used in calculating the coefficient contributions for the first sample. Similarly, a particular angle is associated with the second sample and so on for each of the N samples in the "batch." SAFT, on the other hand, maintains a batch of samples in which one sample is continually changing. If there are eight samples (i.e., N=8), this means that the oldest sample, sample 1, is removed and the previous sample 2 now becomes sample 1. This occurs for each of the samples so that the new sample becomes sample 8. However, the coefficients that are updated during SAFT were derived from calculations of the coefficient contributions where the samples were matched with the angles from the previous position. In other words, the updated coefficients include the error of calculating the coefficient contributions using angles that apply to the earlier sample.

Specifically, SAFT as described in WO 00/67146 introduces an error in the calculated coefficients at the start of the process of subtracting the coefficient contribution of the oldest sample and adding the coefficient contribution of the new sample. The error occurs because the continuous processing of the coefficients causes a shift in the angle associated with each sample. For example, in DFT applications, a particular angle is associated with the first sample and that angle is used in calculating the coefficient contributions for the first sample. Similarly, a particular angle is associated with the second sample and so on for each sample in the "batch." SAFT maintains a batch of samples in which one sample is continually changing. If there are eight samples, this means that the oldest sample, sample 1, is removed and the previous sample 2 now becomes sample 1. This occurs for each of the samples so that the new sample becomes sample 8. However, the coefficients that are updated during SAFT were derived from calculations of the coefficient contributions where the samples were matched with the angles from the previous position. In other words, the updated coefficients include the error of calculating the coefficient contributions using angles that apply to the earlier sample.

In an ideal SAFT process, as a new sample is received after the initial 8 samples (i.e., N=8), sample 2 should take the position in the calculations for sample 1 and use the corresponding angle for sample 1 in generating the coefficient contributions and so on for each following sample. However, this problem was not specifically addressed in the SAFT application described in U.S. patent application Ser. No. 09/560,221 and PCT Application WO 00/67146. Instead, the SAFT described in these patent applications uses the previously calculated coefficients as they are for deriving the updated coefficients that include the new sample. In other words, as a new sample is received after the original N samples have been processed, the SAFT as described in these applications merely subtract the contributions of the first sample N=0 and adds the contributions of the new sample. The SAFT as described in these two patent applications does not describe shifting the samples 2–8 previously received such that they take the position in the calculations for the sample below them and use the corresponding angle for the sample position below them to generate an updated set of coefficients. Instead, the contributions to the coefficients by the second sample of the original set of samples, which is now the first sample of the new set, are still based on the angle associated with the second sample and not the angle of the first sample.

Consequently, there is a need for SAFT calculation capabilities that perform rapidly and with high accuracy for processing coefficients. In addition, there is still a general need for improved methods, apparatus, and computer program products for processing coefficients of functions with greater speed and greater efficiency.

SUMMARY OF THE INVENTION

As set forth below, the apparatus, methods, and computer program products of the present invention overcome many of the deficiencies identified with processing signals using of functions, such as Fourier Transforms. In particular, the present invention provides apparatus, methods, and computer program products that determine the coefficients of a function representative of an input signal with reduced latency and/or improved accuracy. In addition, the present invention provides apparatus, methods, and computer program products that determine sliding aperture coefficients of a function, such as SAFT, representative of an input signal so that the coefficients are accurate and rapidly available. Furthermore, the present invention provides apparatus, methods, and computer program products that derive apparatus, methods, and computer program products for determining the coefficients of a function representative of an input signal with reduced latency and/or improved accuracy.

The present invention provides apparatus, methods, and computer program products that provide complete sets of improved accuracy coefficients of a function representative of a signal as each sample is received so that the improved accuracy coefficients are available with low latency. Specifically, the apparatus, methods, and computer program products of the present invention takes advantage of the independence of samples, uses previously derived coefficients, and updates at least one of the coefficients upon receipt of each sample. The updated coefficients are corrected to account for the change in the angle associated with each of the samples to give accurate coefficients with reduced latency. The present invention also provides apparatus, methods, and computer program products for generating coefficients of a function representative of a signal. The present invention also provides apparatus, methods, and computer program products for generating apparatus, methods, and computer program products for providing coefficients of a function representative of a signal.

In one embodiment, the apparatus of the present invention includes a coefficient generator that receives each of the samples one at a time and updates the coefficients of the function based on each sample as the sample is received without awaiting receipt of the next sample. As such, a complete set of accurate, updated coefficients is available upon receipt of each sample.

In another embodiment, the apparatus, methods, and computer program products of the present invention initially store each of the samples as they are received and generate a first set of coefficients when the last sample of the plurality of samples has been received. Further, when a new sample of the input signal is received, after the predetermined plurality of samples has already been received, the apparatus, methods, and computer program products of the present invention apply the mathematical function associated with the coefficients to the sample and generate a term based on the new sample for each coefficient. To replace the new sample with the first sample of the plurality of the samples, the generated term of the new sample is subtracted from the term associated with the first sample of the predetermined plurality of samples that was previously stored in the memory device. Following this subtraction, the coefficients are updated by the difference between the terms based upon the new sample and the first sample of the predetermined plurality of samples. Next, the accuracy of the coefficients is improved by adjusting the phase angles to correspond to the correct sample numbers.

In another embodiment of the present invention, to replace the new sample with the oldest sample of the plurality of samples, the apparatus, method, and computer program products of the present invention subtract the term based upon the oldest sample of the predetermined plurality of samples from each of the coefficients and adds the term based upon the new sample to each of the coefficients. Next, the accuracy of the coefficients is improved by correction of the coefficients to account for the changes in the angles associated with the samples so that the phase angles correspond to the correct sample numbers. The phase angle corrections are accomplished by applying a rotating reference system for correctly matching the samples, the phase angles, and coefficient contributions.

Additional aspects the present invention are methods and apparatus capable of replacing the standard methods for electronic calculations of mathematical information such as calculations of Fourier Transforms, Laplace Transforms, polynomial formulas, and series formulas. An embodiment of the present invention includes methods and apparatus for performing calculations such as Fourier Transforms, Laplace Transforms, polynomial formulas, and series formulas using algorithms and circuits derived from learning models. Examples of suitable learning models include learning models based on neural networks, learning models based on fuzzy logic networks, learning models based on genetic algorithms, and learning models based on combinations of different types of learning models.

Another aspect of the present invention includes a method for generating alternative designs of methods and apparatus for generating coefficients for functions such as of Fourier Transforms, Laplace Transforms, polynomial formulas, and series formulas. The method of generating the alternative designs includes using learning models to derive at least one component of the information processor. Examples of components for the information processor include algorithms, circuits, and electronic devices involved in the calculations.

DETAILED DESCRIPTION OF THE INVENTION

Figure 1A:
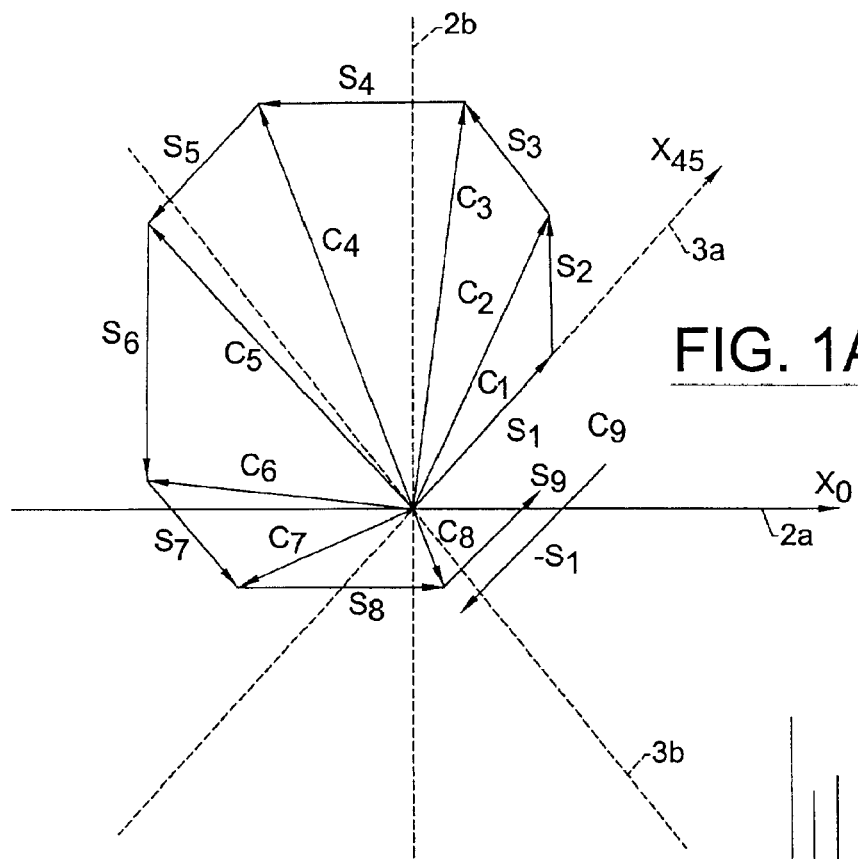
FIG. 1A is a graphical representation of a rotating reference system for determining accurate coefficients of a function representative of an input signal based on a sample of the input signal, where for each sample received, a set of accurate coefficients are output according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

As discussed above, data processing systems have been developed for determining the coefficients of a function that is representative of a signal. However, because many of these systems are complex and do not calculate the coefficients until all samples of the signal have been received, these systems do not provide immediate analysis of the signal. Further, although improved systems have been developed that do provide coefficients on a sample by sample basis, the accuracy of the coefficients may prove to be insufficient for certain specialized applications.

The present invention, on the other hand, provides apparatus, methods, and computer program products that can provide complete sets of accurate coefficients of a function representative of a signal as each sample is received so that the coefficients are available with low latency. Specifically, the apparatus, methods, and computer program products of the present invention, taking advantage of the independence of samples, uses previously derived coefficients and updates at least one of the coefficients upon receipt of each sample. The updated coefficients are corrected to account for the change in the angle associated with each of the samples to give accurate coefficients with reduced latency. The present invention also provides apparatus, methods, and computer program products for generating coefficients of a function representative of a signal. The present invention also provides apparatus, methods, and computer program products for generating apparatus, methods, and computer program products for providing coefficients of a function representative of a signal.

For illustrative purposes, the various apparatus, methods, and computer program products of the present invention are illustrated and described below in conjunction with the characteristics of Fourier Series. It should be apparent, however, that the apparatus, methods, and computer program products of the present invention can be used with many different types of functions. For instance, the apparatus, methods, and computer program products may be used with functions such as Bessel functions, Legendre Polynomials, Tschebysheff Polynomials of First and Second Kind, Jacoby Polynomials, Generalized Laguerre Polynomials, Hermite Polynomials, Bernoulli Polynomials, Euler Polynomials, and a variety of Matrices used in Quantum Mechanics, Linear Analysis functions, wavelets and fractals. This list is by no means exhaustive and is provided as mere examples. The approach may be applied to any function that can be expressed as a sequence of values. The usefulness of the application of these and other functions not listed above is quite general. This method provides a way to develop apparatus and methods for parallel computing and remove redundancy in a rote manner, which is compatible with machine execution.

An important concept of the present invention is the independence of the samples used to determine the coefficients of a function. This concept is more fully described and illustrated in U.S. patent application Ser. No. 09/560,221 and PCT Patent Application WO 00/67146, with a brief description provided below. The independence of samples can be illustrated in the context of Fourier Transforms. The Fourier Transform is based on the principle of orthogonality. As a Fourier Transform is applied in the DFT, it provides a means to evaluate the amplitude of the components of each frequency of a signal totally independently. The frequencies used in the computation are consecutive integral multiples of the base frequency. The base frequency is the time period required to take one set of samples. The samples of the signal are multiplied by each member of the set of orthogonal functions and summed for one or a plurality of cycles of the base frequency. Each resulting coefficient is the amplitude of the real or imaginary part of one test frequency. Importantly, the computation of a coefficient is independent of the computation of the other coefficients. In a set of samples N, that are transformed by the DFT, each sample contributes to each coefficient of the function based on either the sine or cosine of the applicable angle and normalization constants.

In one embodiment, the methods, apparatus, and computer program products of the present invention update a current set of N Fourier Coefficients based on a current set of samples to a subsequent set of N coefficients based on the contribution of a new sample and the removal of the contribution of the oldest sample. Each set of coefficients is corrected to correspond to the classical Fourier Transform of the N samples it contains. The new set of samples differs from the old set only by the addition of the new sample, subtraction of the oldest sample, and correction of the coefficients to account for the changes in the angles associated with the samples. The update can be done in a single update procedure on each coefficient.

The correction of the coefficients for the N samples is essentially equivalent to changing the reference system for the samples. This is equivalent to rotating the reference system to match the appropriate angles with the appropriate samples. Conceptually, the rotating reference system redefines the position of the first sample. The position of the first sample must be redefined because the oldest sample, the previous first sample, is removed and the new sample is added to complete the new set N of samples. The rotating reference system results in sample 1 being associated with the angle for sample 1 and sample 2 being associated with the angle for sample 2 and so on for each of the samples. The correction of the coefficients includes correcting the contributions to the coefficients for each of the samples so that the contributions include the correct angle for each of the samples.

Reference is now made to FIG. 1 wherein there is shown a graphical representation of a rotating reference system for a set of samples represented by S and a set of coefficients represented by C. The coefficients are for a set of 8 samples, and, for this example, assume that all coefficients are set to zero at time zero. FIG. 1 illustrates a transform of eight samples for the case of the coefficients corresponding to the base frequency. The samples are equally spaced in time. The coefficient magnitude is the distance from the origin, and angle is measured from a traditional x-axis $2a$. As the angle advances one revolution ($2*\pi$), there are N sample times, (eight sample times in FIG. 1). Each sample time therefore represents a rotation of $(2*\pi)/N$ degrees for the base frequency ($\pi/4$, i.e. 45 degrees in FIG. 1). Progressing from the base frequency to the N/2 frequency (n=1, 2 ... N/2), the incremental rotation of the nth frequency will be n-times that of the base frequency, that is, $(2*n*\pi)/N$ degrees.

The representation described in FIG. 1 is intended to replace the traditional graph obtained by plotting the samples along the x-axis. This is usually shown for one period with each sample value plotted as a value on the y-axis and is commonly referred to as a waveform. A vector represents the contribution from each sample in FIG. 1. The magnitude of the vector is given by the value of the sample. The direction of the vector is given by its index multiplied by the angular increment between samples. In this case, the increment is 45 degrees for the base frequency, (i.e., 360 degrees/8 samples).

The rotating reference system described in FIG. 1 can also be described using the relevant equations. For the following discussion, C and S are vectors (vectors are in bold font). The coefficients and samples are related by the following equations.

$$C8=S1+S2+S3+S4+S5+S6+S7+S8 \quad (1)$$

$$C1=S1 \quad (2)$$

$$C2=C1+S2=S1+S2 \quad (3)$$

$$C3=C2+S3=S1+S2+S3 \quad (4)$$

...

$$C=C8=C7+S8=S1+S2+S3+S4+S5+S6+S7+S8 \quad (5)$$

As described in greater detail in U.S. patent application Ser. No. 09/560,221 and PCT Application No. WO 00/67146, the coefficients of the DFT function, (i.e., A0, A1, A2, ... and B0, B1, B2, ...), are defined by the summation of the application of each sample to the sine and cosine functions associated with each coefficient. In vector terms, the A's are projections of the sample vectors on the x-axis $2a$, and B's are projections on y-axis $2b$. The values of these are calculated by multiplying cosine and sine values respectively for the applicable angles (multiples of 45 degrees). The numerical index indicates the sample number. The k index represents the coefficient numbers that correspond to the increasing spectral frequencies, k=1, ..., N/2. Equations (6) through 9 are written for N=8, therefore k=1, ..., 4. For k=0:

$$A0=S1*\cos(0)+S2*\cos(0)+...+S8*\cos(0)=S1+S2+...S8 \quad (6)$$

$$B0=S1*\sin(0)+S2*\sin(0)+...+S8*\sin(0)=0 \quad (7)$$

For k=1:

$$A1=S1*\cos(1*45)+S2*\cos(2*45)+...+S8*\cos(8*45) \quad (8)$$

$$B1=S1*\sin(1*45)+S2*\sin(2*45)+...+S8*\sin(8*45)$$

For any k:

$$Ak=S1*\cos(k*1*45)+S2*\cos(k*2*45)+...S8*\cos(k*8*45) \quad (9)$$

$$Bk=S1*\sin(k*1*45)+S2*\sin(k*2*45)+...S8*\sin(k*8*45)$$

This gives the classical FFT coefficients for the first N samples, eight samples when N=8.

Next, a Sliding Aperture Fourier Transform, SAFT, is developed to update to a new Fourier Transform based on each new sample. At the arrival of the 8th sample, the coefficients were calculated based on the values of the latest 8 samples, which are samples 1 to 8 respectively. At the arrival of the 9th sample, the coefficients will be calculated based on the values of the latest 8 samples, which are samples 2 to 9 respectively. The 9th sample has an associated vector oriented at 45 degrees from x-axis $2a$, which is the same direction as for the 1st sample, (oldest sample), thus the notation S9=S1'. The update for the new coefficients based on the new sample set includes adding S1' and subtracting S1. The updated coefficient, C', is represented by equation (10).

$$C'=S2+S3+S4+S5+S6+S6+S8+S9=(S1+S2+S3+S4+S5+S6+S6+S8)-S1+S1'=C+S1 \quad (10)$$

The 10th sample has an associated vector oriented at the same angle as the 2nd sample, and is thus denoted S2'; the updated coefficient after the arrival of S2' is C'' given by equation (11).

$$C''=C'+S2'-S2 \quad (11)$$

The update calculation applies to projections of the coefficient, A1 and B1 as well. Equation (12) shows sample calculations for A and B.

$$A = A + S9*\cos(45) - S1*\cos(1*45) \quad (12)$$

$$B = B + S9*\sin(45) - S1*\sin(1*45)$$

However, while for Cs, the above computations are sufficient and correct, the computation of the As and Bs, which are projections on a reference system, need an adjustment for the rotation of the reference system, without which their values, as given by Equation (12) are inaccurate and differ from the classical Fourier Coefficients. Generally speaking the coefficient is defined in terms of first sample of the set weighed by the appropriate trigonometric function, (cosine for As, sine for Bs), of 45 degrees, and the second sample weighted by the trigonometric function of (2*45) degrees, and so on for each sample. But, an error is introduced in the updated coefficient because the first sample for the new set, (set consisting of sample 2 through sample 9), was the second sample of the original set, (1 to 8), and was weighed in calculations with the trigonometric function of (2*45).

Figure 1B:
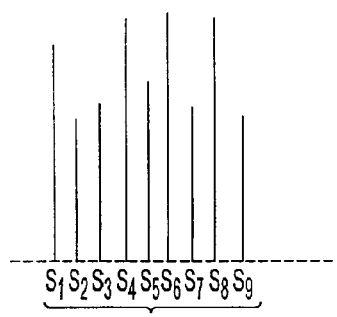
FIG. 1B is a graphical representation of the magnitude of the samples illustrated in FIG. 1A.

Embodiments of the present invention correct the error in the updated coefficients. The correct coefficients are obtained by providing a rotating reference system. Graphically, this is illustrated in FIG. 1A. FIG. 1A shows a rotated reference system represented by x-axis $3a$, also labeled x45 in FIG. 1A, and corresponding y-axis $3b$. Based on the rotated reference, Sample 2 has the contribution of the First Sample, i.e. of 45 degrees. The x-axis $3a$ is the new axis in terms of which the projections are calculated. In practice, the reference system rotates each time the oldest sample is replaced with the new sample. FIG. 1B illustrates the magnitude of the samples.

Figure 1C:
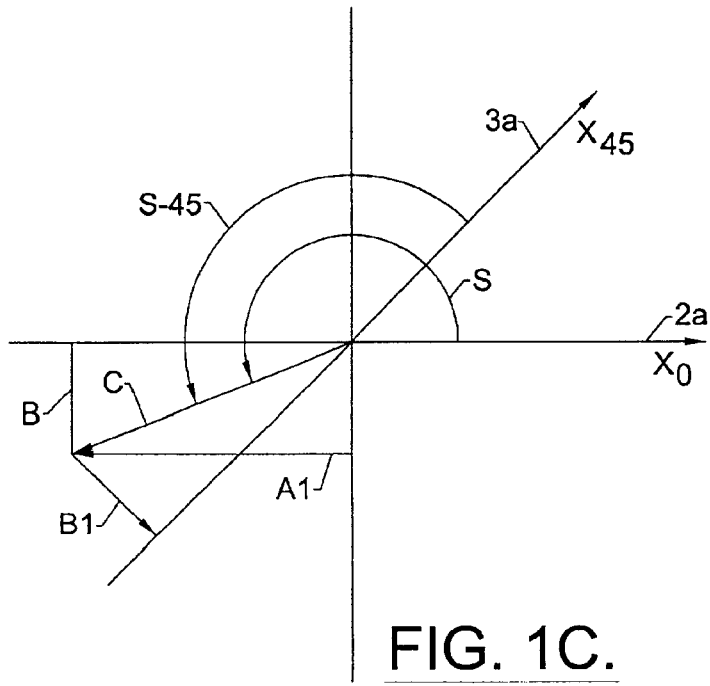
FIG. 1C is a graphical representation illustrating necessary coefficient modifications in relation to the rotation of the reference system according to one embodiment of the present invention.

FIG. 1C illustrates the necessary coefficient modification in relation to the rotation of the reference system. In FIG. 1C, S denotes the phase of the vector C—the angle between vector C and the x-axis of the reference system. When the system rotates 45 degrees anti-clockwise the new phase becomes (s-45). Thus, the following equations apply:

$$A = C*\cos(s) \quad (13)$$

$$B = C*\sin(s)$$

$$A' = C*\cos(s-45)$$

$$B' = C*\sin(s-45)$$

For example, the values of A and B calculated by equation (12) are converted to A', B' to obtain the Classical Fourier Coefficients, i.e., accurate coefficients. Using the trigonometric identity for the difference of two angles and substituting A and B for their equivalents gives the following general equations representing accurate determinations for A and B:

$$Ai' = Ai*\cos((i*2*\pi)/N) + Bi*\sin((i*2*\pi)/N) \quad (14)$$

$$Bi' = Bi*\cos((i*2*\pi)/N) - Ai*\sin((i*2*\pi)/N)$$

If the polar form of the Fourier Coefficients is sought, rather than vector form as described e.g. by Equations (10–11), or the form illustrated by Equations 12 and 14, the values, (vector magnitude), of coefficients C are given by:

$$C_1 = S_1, p_0 = 45 \quad (15)$$

$$C_2^2 = C_1^2 + S_2^2 - 2*C_1*S_2*\cos(p_1 + 90)$$

$$C_3^2 = C_2^2 + S_3^2 - 2*C_2*S_3*\cos(p_2 + 45)$$

$$\ldots$$

$$C_8^2 = C_7^2 + S_8^2 - 2*C_7*S_8*\cos(p_7 - 180)$$

This leads to equation (16), the general equation for calculating the value of the coefficients C:

$$Ci^2 = C_{i-1}^2 + S_i^2 - 2*C_{i-1}*S_i*\cos(p_{i-1} + 180 - 45*i) \quad (16)$$

where i is current coefficient number, $p_{i-1}$ is the angle between the previous coefficient $C_{i-1}$ and the current/latest sample $S_i$.

Squared Fourier Coefficients could be preferable in certain applications. For other applications, it is possible to correct the coefficient values directly with equation (17).

$$Ci = (C_{i-1}^2 + S_i^2 - 2C_{i-1}*S_i*\cos(p_{i-1} + 180 - 45*i))^{0.5} \quad (17)$$

The general case equation for the phase of the coefficients is given in equation (18).

$$\tan(p_i) = \sin(p_{i-1}) + (S_i/(C_{i-1}))*\sin(i*j*2*\pi/N)/\cos(p_{i-1}) + (S_i/(C_{i-1}))*\cos(i*j*2*\pi/N) \quad (18)$$

where i=sample number, j=coefficient number, N=number of samples, π is the mathematical constant (~3.14 radians).

It is to be understood that the method of using a rotating reference system for producing accurate coefficients applies to other functions as well as to Fourier transform calculations. The equations and relationships required for doing the correction, i.e. correcting the phase angle, will depend on the functions being used. Techniques such as mathematical analysis may be usable for deriving the correcting equations and relationships for other functions as understood by those skilled in the art.

Those skilled in the art will also recognize that the methods, apparatus, and computer program products of the present invention are not restricted to any particular method for deriving the coefficient contributions for samples. Essentially any known methods or any new methods for deriving coefficient contributions can be used in embodiments of the present invention.

Figure 2:
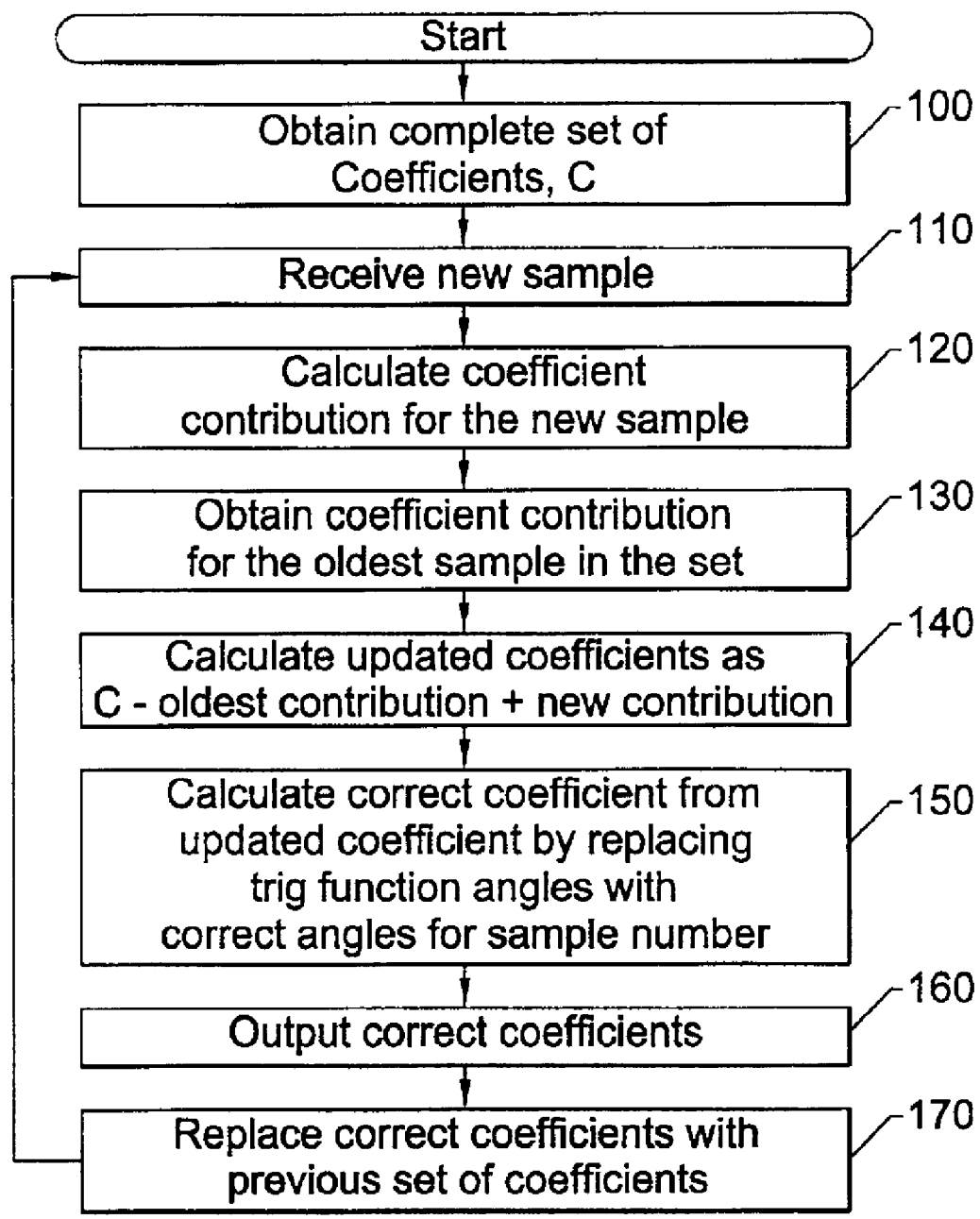
FIG. 2 is a block diagram of the operations performed to determine accurate coefficients of a function representative of an input signal based on a sample of the input signal, where for each sample received, a set of accurate coefficients are output according to one embodiment of the present invention.

With reference now the FIG. 2, there is shown a block diagram of the operations performed to determine the coefficients of a function representative of an input signal according to one embodiment of the present invention. In preferred embodiments, the operations are machine executable such as operations that can occur in a computer or other type of electronic device. After start, there is the step of obtaining a complete set of coefficients. (See step 100). In practicing embodiments of the present invention, the initial set of coefficients may be generated by any suitable method.

The initial set of coefficients may be a real set of coefficients corresponding to a set of actual samples generated by standard methods for obtaining coefficients. If the coefficients are Fourier transform coefficients then they can be obtained, for example, by solving the DFT using methods such as the Fast Fourier transform, the Pelton approach described in U.S. patent application Ser. No. 09/560,221 and PCT Application No. WO 00/67146, or any of the methods of deriving Fourier transform coefficients. Alternatively, the initial set of coefficients may be a "dummy" set of coefficients. It is suitable to use an initial set of coefficients that are derived using the method of padding with zeros. Essentially, there is great flexibility in selecting the initial set of coefficients. The initial set of coefficients may be stored in a memory such as a computer readable memory.

The next step involves receiving a new sample such as a sample of a signal to be represented by the coefficients. (See step 110). The new sample is used to calculate coefficient contributions for the new sample. (See step 120). The coefficient contributions are calculated according to the equations representing the function for which the coefficients are being derived. Fourier transform coefficient contributions are calculated using the sample, the appropriate trigonometric functions, the sample number, and the coefficient number.

The operation also includes the step of obtaining the coefficient contributions for the oldest sample in the set of samples. (See step 130). The coefficient contributions for the oldest sample can be obtained by a variety of techniques. For example, the coefficient contributions for the oldest sample may have been previously stored in an accessible memory. Alternatively, the oldest sample may have been stored previously in an accessible memory and the coefficient contributions can be calculated using the oldest sample.

Using the coefficient contributions for the oldest sample and the coefficient contributions for the new sample, the coefficients can be updated. (See step 140). The updated coefficient is obtained by subtracting the coefficient contributions for the oldest sample and adding the coefficient contributions for the new sample. If the coefficients being generated are for Fourier transform coefficients, the updated coefficient obtained in this step are equivalent to those provided by the Sliding Aperture Fourier Transform. Specifically, the coefficients are inaccurate and do not equal the classical Fourier transform coefficients. To obtain accurate coefficients, the methods, apparatus, and computer program products according to embodiments of the present invention correct the updated coefficients to provide coefficients that more accurately represent the signal. (See step 150). The methods, apparatus, and computer program products of the present invention incorporate the correct reference system for the set of samples including the new sample so that the angles used in deriving the coefficient contributions are the correct angles or each of the samples. For Fourier transform coefficients, the correct coefficients correspond to the classical Fourier transform coefficients.

As stated earlier, the rotating reference system provides the correct angles for each of the samples. The rotating reference system can be incorporated into embodiments of the present invention for generating Fourier coefficients by using Equation (14) in methods, apparatus, and computer program products of the present invention. Application of the rotating reference system to coefficients of other types of functions may require equations that are specifically applicable to the particular function. As an option, the equations may be derived analytically; alternatively, the equations may be derived using learning models.

After generating the correct coefficients, there may be an optional operation step of outputting the coefficients. (See step 160). In this step, the coefficients for the set of samples including the new sample are made available for uses such as display, analysis, and further signal processing.

Another operational step after generating the coefficients is to replace the coefficients for the set of samples including the new sample with the previous set of coefficients. (See step 170). If the operation is to be continued, then the operation returns to the step of receiving a new sample (i.e. returned to step 110).

As indicated earlier, the methods, apparatus, and computer program products of the present invention have the flexibility of using a wide variety of techniques for generating the initial set of coefficients. Similarly, the methods, apparatus, and computer program products of the present invention have the flexibility of using a wide variety of techniques for generating the coefficient contributions for the samples. For example, for Fourier transforms, the coefficients may be provided using the Fast Fourier transform. Alternatively, the coefficients may be provided using the Pelton approach as described in U.S. patent application Ser. No. 09/560,221 and PCT Application No. WO 00/67146. Also, the coefficient updates may also be obtained using techniques such as the Pelton.

Figure 3:
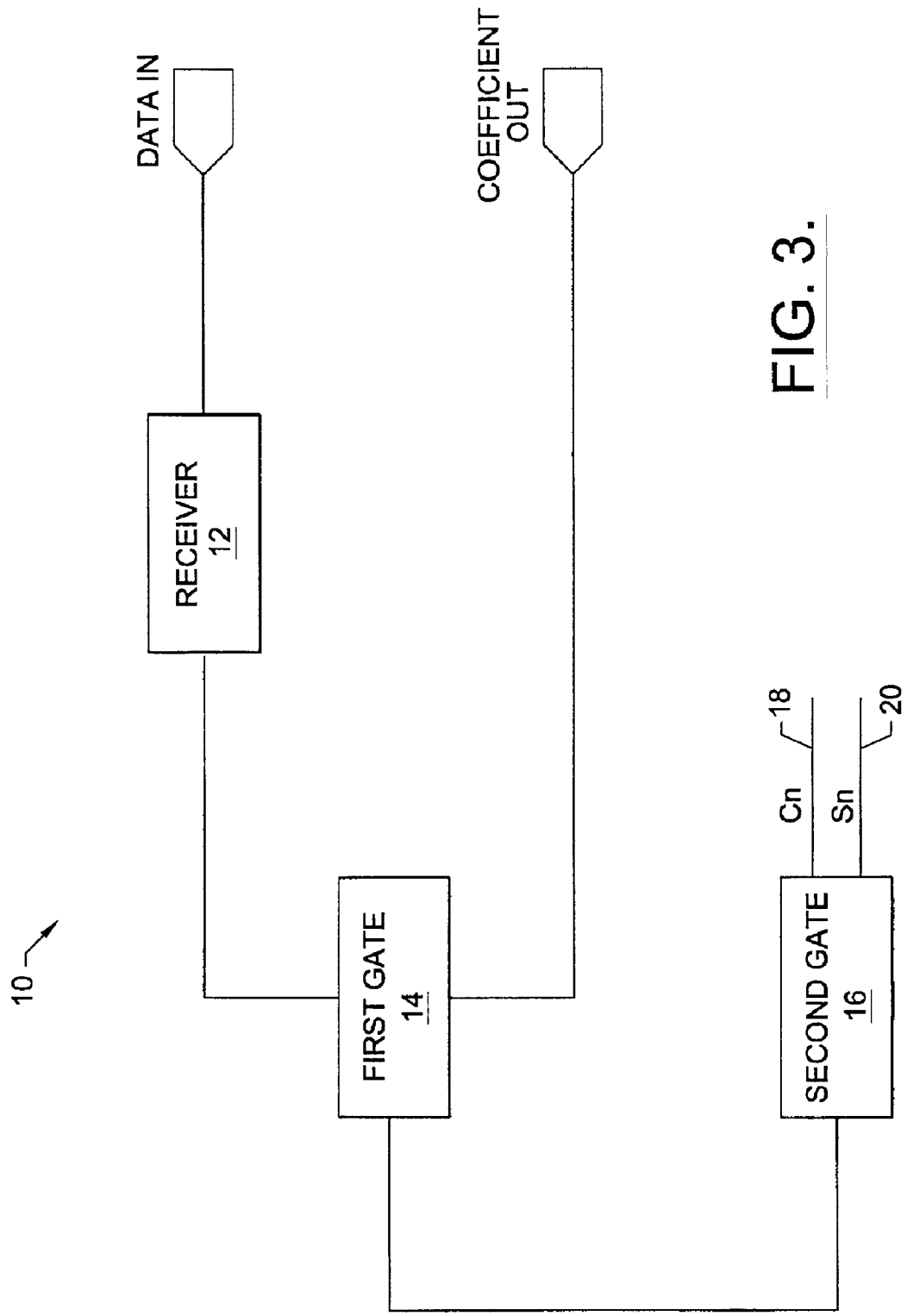
FIG. 3 is a block diagram of an apparatus for determining the coefficients of a function representative of an input signal based on a sample of the input signal using gate devices according to one embodiment of the present invention.
Figure 4:
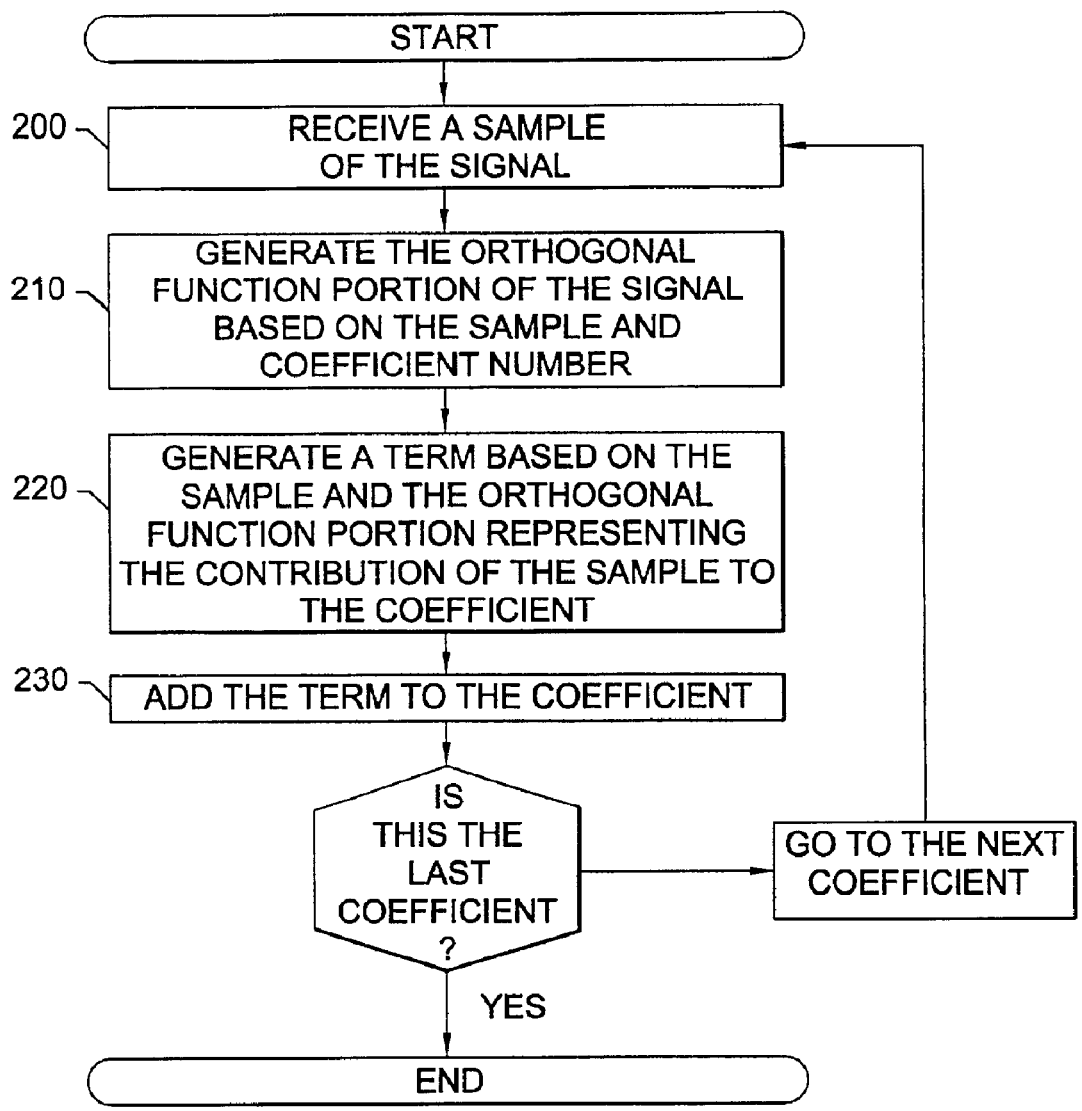
FIG. 4 is a block diagram of the operations performed to determine the coefficients of a function representative of an input signal based on a sample of the input signal according to one embodiment of the present invention.

An example of a configuration of the Pelton approach suitable for determining coefficient contributions and/or coefficients for use in methods, apparatus, and computer program products of the present invention is illustrated in FIG. 3 and FIG. 4. These figures are similar to those discussed in U.S. patent application Ser. No. 09/560,221 and PCT Application No. WO 00/67146. With reference now to FIG. 3, one configuration for determining the initial set of coefficients of a function representative of an input signal based on samples of the input signal is shown. The apparatus of this embodiment of the present invention includes a coefficient generator 10. The coefficient generator includes a receiver 12 for receiving samples of an input signal. The coefficient generator also includes a first gate 14 in digital communication with the receiver and a second gate 16 in digital communication with the first gate. It is to be understood that being in digital communication has the meaning of a connection that permits the transfer of information digitally. A variety of technologies can be used to achieve digital communication. An example of digital communication is the use of electrical signals such as those for electrical communication. Another example of digital communication is the use of optical signals such as those for optical communication.

With reference to FIG. 4, the operation of the coefficient generator is illustrated. In this illustration, the coefficient generators generates the coefficients based on N=8 samples of the signal. For each sample, the receiver receives a sample of the signal and inputs the sample to the first gate 14. (See step 200). For each coefficient, the second gate receives two values, one 18 representing the number of the coefficient and the other 20 representing the sample number. Based on the coefficient number and the sample number, the second gate generates the orthogonal function portion of the signal. (See step 210).

For the zeroth coefficient A0, the sample value is added to the coefficient. For the first sample and coefficient A$1_1$, the orthogonal function is:

$$\cos(2\pi C_n S_n/N)$$

where:
 C$n$=coefficient number;
 $S_n$=sample number; and
 N=number of samples.

To calculate the term for the first coefficient and first sample, the second gate receives the coefficient number 18 and the sample number 20. Based on this, for the first sample $S_n$ and the first coefficient $C_n$, the second gate generates $\cos(2\pi\cdot1\cdot1/8)$ or $\cos(2\pi/8)$ and outputs this value to the first gate. (See step 210).

The first gate, in turn, receives the value from the second gate and the value of the sample from the receiver. Based on these values, the first gate generates a term representing the contribution of the sample to the coefficient, (i.e., $S_1 \cos(2\pi/8)$). (See step 220). This term is then added to the coefficient A1, (i.e., A1+A$1_1$). (See step 230). This is repeated for each coefficient. (See steps 240 and 250).

The discussion above illustrates the updating of each coefficient one at a time with each sample. Further, it must be understood that the coefficient generator could update all of the coefficients with each sample simultaneously. For example, the coefficient generator could contain a plurality of first and second gates all connected to the receiver. In this embodiment, the sample is supplied to each set of gates simultaneously, and each set of gates, in turn, generates the term for each coefficient representing to the contribution of the sample to each coefficient simultaneously, and each coefficient is updated simultaneously. Specifically, the coefficient generator is typically implemented to update all coefficients simultaneously. Further, in some instances, the coefficient generator is configured to received inputs from several channels, for which the coefficient generator generates a set of coefficients for each channel. However, in the typical embodiments described here, the coefficient generator is illustrated as updating each coefficient sequentially and with only one channel for sake of clarity.

The coefficient generator and operations illustrated in FIG. 3 and FIG. 4 are suitable for use in embodiments of the present invention for generating the initial set of coefficients and/or for generating coefficient contributions.

Figure 5:
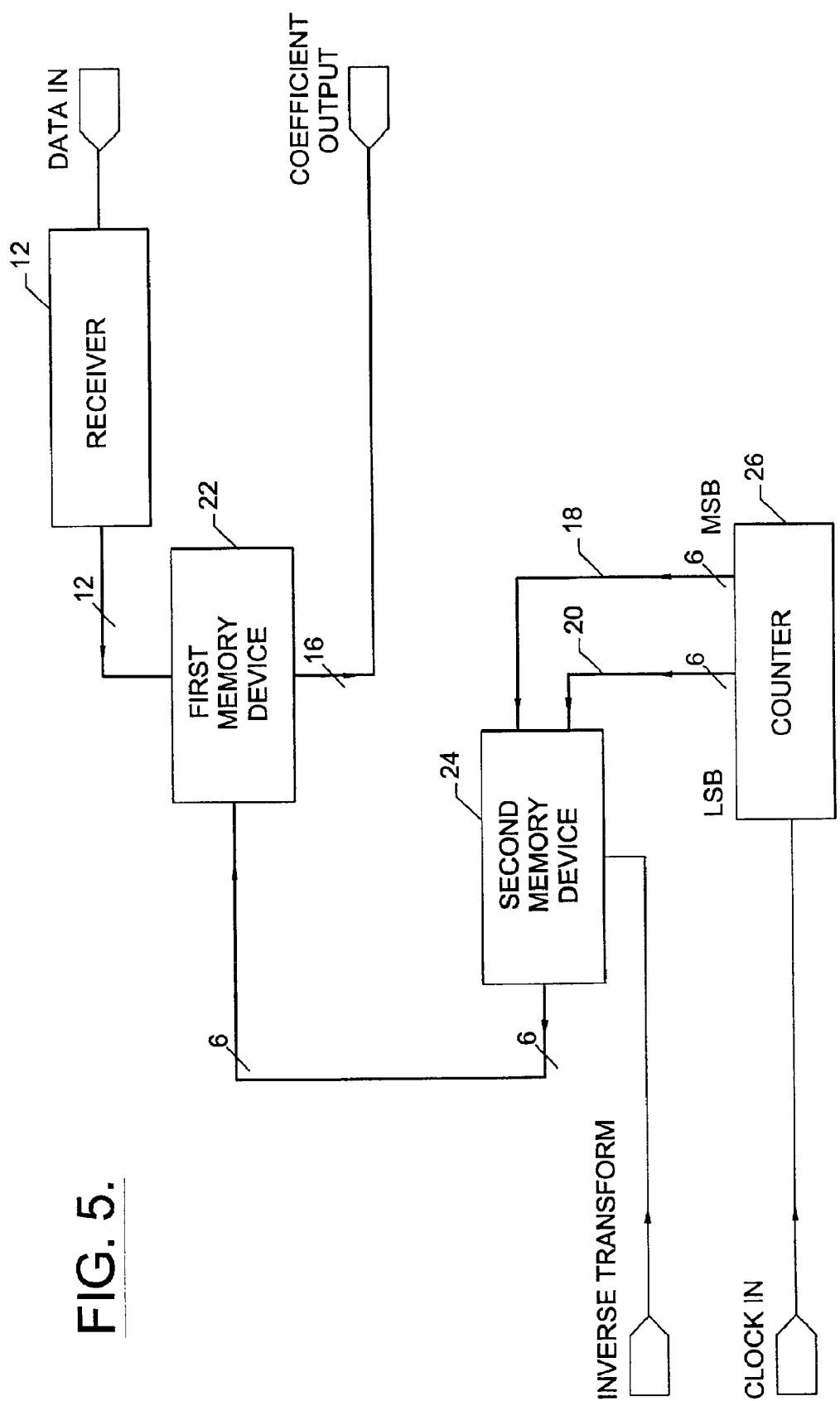
FIG. 5 is a block diagram of an apparatus for determining the coefficients of a function representative of an input signal based on a sample of the input signal using at least one memory device according to one embodiment of the present invention.

FIG. 3 illustrates the determination of the coefficients and coefficient contributions based on the use of gates, such as multipliers, adders, dividers, or other gated functions. FIG. 5, which is also discussed in U.S. patent application Ser. No. 09/560,221 and PCT Application No. WO 00/67146, illustrates the determination of the coefficients and coefficient contributions using at least one memory device. Use of memory devices, as opposed, to gates may be advantageous, as many of the values that must be calculated to determine the coefficients may be pre-stored in the memory devices. This, in turn, may save time in determining the coefficients.

With reference to FIG. 5, the coefficient generator of this embodiment includes a receiver 12 for receiving samples of a signal. The coefficient generator also includes a first memory device 22 in digital communication with the receiver and a second memory device 24 in digital communication with the first memory device. Optionally, the second memory device includes an array of cells, where each cell contains a pre-calculated value representing the orthogonal function portion of the signal for each sample and coefficient. For example, the second memory device includes a cell for the orthogonal function portion of the signal for the first sample and coefficient equal to $\cos(2\pi C_n S_n/N)$ or $\cos(2\pi/8)$. In this configuration, the first memory device may be a multiplier.

With reference to FIG. 4 and FIG. 5, in operation, for each sample, the receiver receives a sample of the signal and inputs the sample to the first memory device 22. (See step 200). For each coefficient, the second memory device receives a token representing the address of the cell containing the orthogonal function portion of the signal for the sample and coefficient. This token is provided by the inputs, 18 and 20, where one portion of the token is the coefficient number $C_n$ and the other portion is the sample number $S_n$. Based on the token, the second memory device retrieves the value associated with the coefficient and sample and outputs the value to the first memory device. (See step 210). The first memory device, in turn, receives the value from the second memory device and the value of the sample from the receiver. Based on these values, the first memory device generates a term representing the contribution of the sample to the coefficient, (i.e., $S_1 \cos(2\pi/8)$, for the first sample and coefficient). (See step 220). This term is then added to the coefficient, (i.e., A1+A1$_1$). (See step 230). This is repeated for each coefficient. (See steps 240 and 250).

In some embodiments of the present invention, the sample received from the receiver is one of a number of finite values. Since the orthogonal function portion for each sample and coefficient is previously known, (i.e., $(2\pi C_n S_n/N)$), and the sample can only be one of a finite number of values, values representing each sample value, sample number, and coefficient number can be pre-calculated and pre-stored. As such, when a sample is received, the term representing the sample's contribution to each coefficient can be determined by looking up the value in the memory device based on the value of the sample, sample number, and coefficient number.

In light of this, in one further embodiment, the first memory device is a memory device containing an array of cells. Each cell of the first memory device includes a pre-calculated value representing each sample value, sample number, and coefficient number. For each coefficient and sample, the memory device contains a group of cells, each having the orthogonal function associated with the coefficient and sample multiplied by a possible value for the sample. For example, for the first sample and coefficient, there are a group of cells having a value of $S_1 \cos(2\pi/8)$, where each cell represents the value for a different possible value of $S_1$. Additionally, the second memory device has an array of cells each having a token representing the orthogonal function portion for each sample and coefficient.

In operation, with reference to FIG. 4, for each sample, the receiver receives a sample of the signal and inputs the sample to the first memory device 22. (See step 200). For each coefficient, the second memory device receives from the inputs, 18 and 20, values representing the address of the cell containing the token representing the orthogonal function portion of the signal for the sample and coefficient. The second memory device retrieves the token associated with the coefficient and sample and outputs the token to the first memory device. (See step 210). The first memory device, in turn, receives the token from the second memory device and the value of the sample from the receiver. Based on the token and the value of the sample, the first memory device looks up the cell in the array corresponding to these values and outputs a term representing the contribution of the sample to the coefficient, (i.e., $S_1 \cos(2\pi/8)$, for the first sample and coefficient). (See step 220). This term is then added to the coefficient, (i.e., A1+A1$_1$). (See step 230). This is repeated for each coefficient. (See steps 240 and 250).

Again, it must be understood that the apparatus of this configuration may operate in a parallel configuration to update each coefficient simultaneously by providing a plurality of first and second memory devices for each coefficient that are all connected to the receiver. In this embodiment, each first and second memory device receives the sample simultaneously and is addressed appropriately such that each set of first and second memories address values for the different coefficients. Thus, the contribution of the sample to each coefficient is determined in parallel and simultaneously.

With reference to FIG. 5, in one additional configuration for providing the initial set of coefficients and/or for providing coefficient contributions, the coefficient generator may include a counter 26 in digital communication with the second memory device 24. The counter may be incremented by a clock, not shown, that is timed to allow calculations to be made. The counter may include two outputs, 18 and 20, which represent the coefficient number and sample number for addressing the second memory device. In operation, for each sample, the sample number is held constant, while for each cycle or plurality of cycles of the clock, the counter increments the coefficient number. This, in turn, addresses the second memory device for determining the contribution of the sample to each coefficient. After, all of the coefficients have been calculated for that sample, the sample number of the counter is incremented, and the coefficient number is reset, such that the next sample is now evaluated for each coefficient.

As detailed above, to reduce time for calculations, one embodiment of the present invention uses memory devices to store pre-calculated values and tokens to address the memory devices. An important concern in many electronic designs is the desire to minimize the number of components needed to operate the circuit and also the need to use off-the-shelf components wherever possible. In light of this, methods are needed that evaluate the need aspects of a design and determine design solutions that minimize the number of components and allow for the use of standard components.

Figure 6:
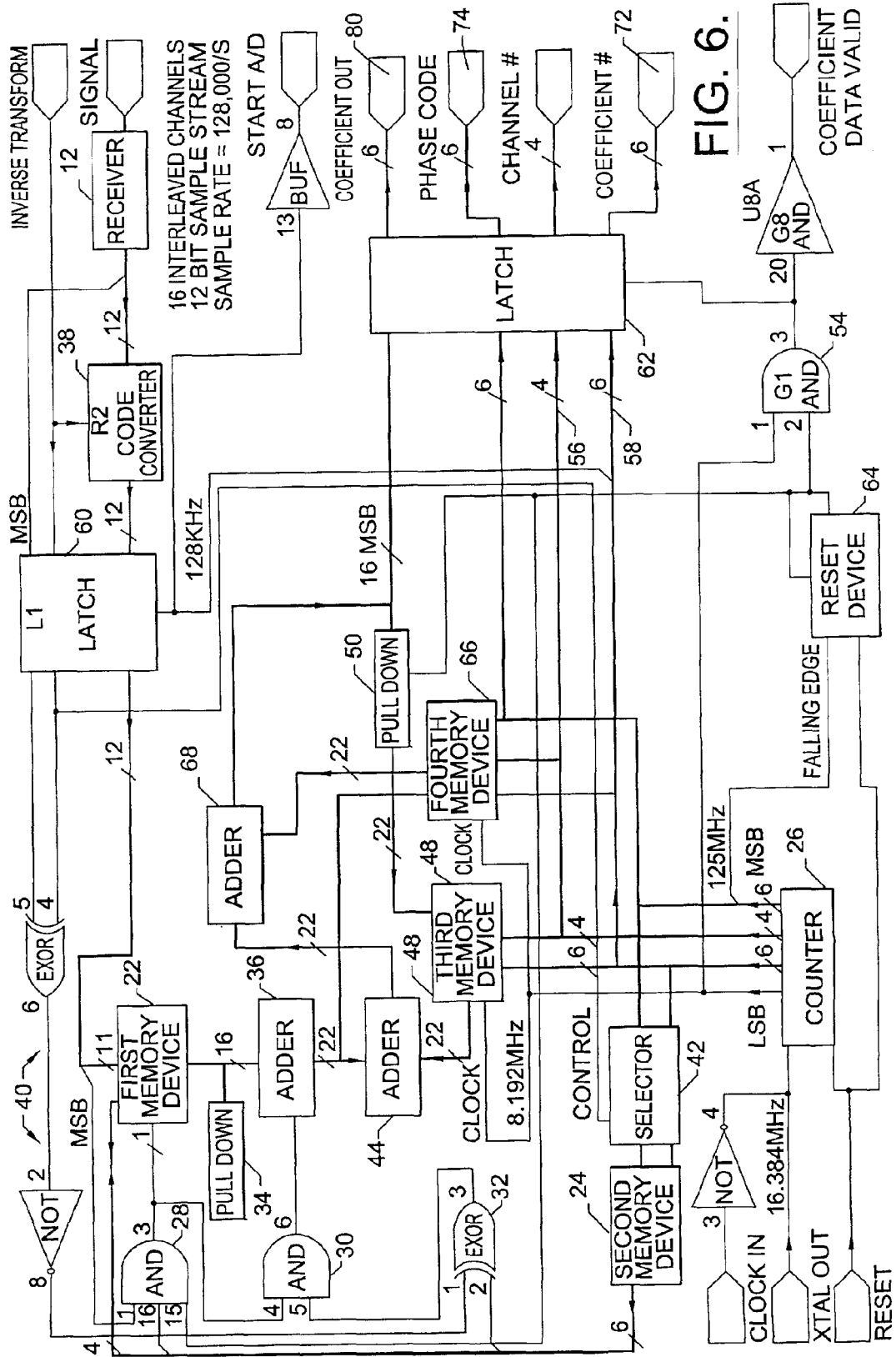
FIG. 6 is a block diagram of an apparatus for determining the coefficients of a function representative of an input signal based on a plurality of samples of the input signal using memory devices and gates, where for each sample received, a set of coefficients are output according to one embodiment of the present invention.

As mentioned above and discussed in U.S. patent application Ser. No. 09/560,221 and PCT Application No. WO 00/67146, the number of values that must be stored to calculate the coefficients of functions can be decreased by removing redundant values, storing only the magnitude of the values, and using token bits to signify when a value is zero or the sign of a value. As such, FIG. 6 illustrates the updating of each coefficient for each sample received and illustrates a coefficient generator with the addition of gates to reduce the amount of values that must be stored. Furthermore, FIG. 6 provides a configuration for determining the coefficient contributions and/or coefficients of a function using a first memory device having the minimum number of values stored, a second memory device with tokens that include bits for indicating sign and zero, and a signed input value.

The coefficient generator 10 of FIG. 6 includes first and second memory devices, 22 and 24. Both of the memory devices include arrays of cell for storing values. The second memory device includes tokens representing the coefficient and sample number, and the first memory device includes all of the possible unique values of the sample combined with the orthogonal function portion for each sample and coefficient. Although any system or device may be use for addressing the second memory device, the present embodiment illustrates a counter 26 to address the second memory device.

The coefficient generator of this embodiment further includes an adder 44 in digital communication with the output of the first memory device. Connected to the adder 44 is a crossbar or selector 46 and a third memory device 48. The coefficient generator also includes a null or pull down device 50 in digital communication with the crossbar, and a NAND gate 52 and AND gate 54, connected to the output of the counter.

Additionally, the coefficient generator of this embodiment also includes a first AND gate 28, a second AND gate 30, and an XOR gate 32. Connected to the output of the second AND gate 30 is an adder 36, typically implemented so as to take the twos complement of a signal. The XOR gate 32 is in digital communication with the output of the second memory device and a gate combination 40. The coefficient generator of this embodiment also includes a null device or pull down 34 in digital communication with the output of the first memory device.

The coefficient generator also includes a code converter 38 in digital communication with the receiver 12 for converting the input signal, if necessary, to a 12-bit value having 11 bits representing the value and 1 bit for the sign. The coefficient generator of this embodiment also uses a 6-bit token stored in the second memory device to address the values stored in the first memory device. The tokens operate in conjunction with the second AND gate 30 and adder 36 to take the negative of the output of the first memory device, if the sign bit of the token indicates the negative of the value. Further, the null or pull down device 34 and the zero bit of the token operate to null or zero the output of the first memory device, if the token indicates that the value should be zero.

Still further, the coefficient generator includes a first 60 latch for latching the input signal and a second latch 62 for latching out the output coefficient values. The coefficient generator also includes an input 44 and gate combination 40 for using the coefficient generator to determine the coefficients of an inverse function of the signal. Further, the coefficient generator includes reset device 64 for resetting the memory and outputs 56 and 58 for outputting the coefficient and channel number.

Figure 7:
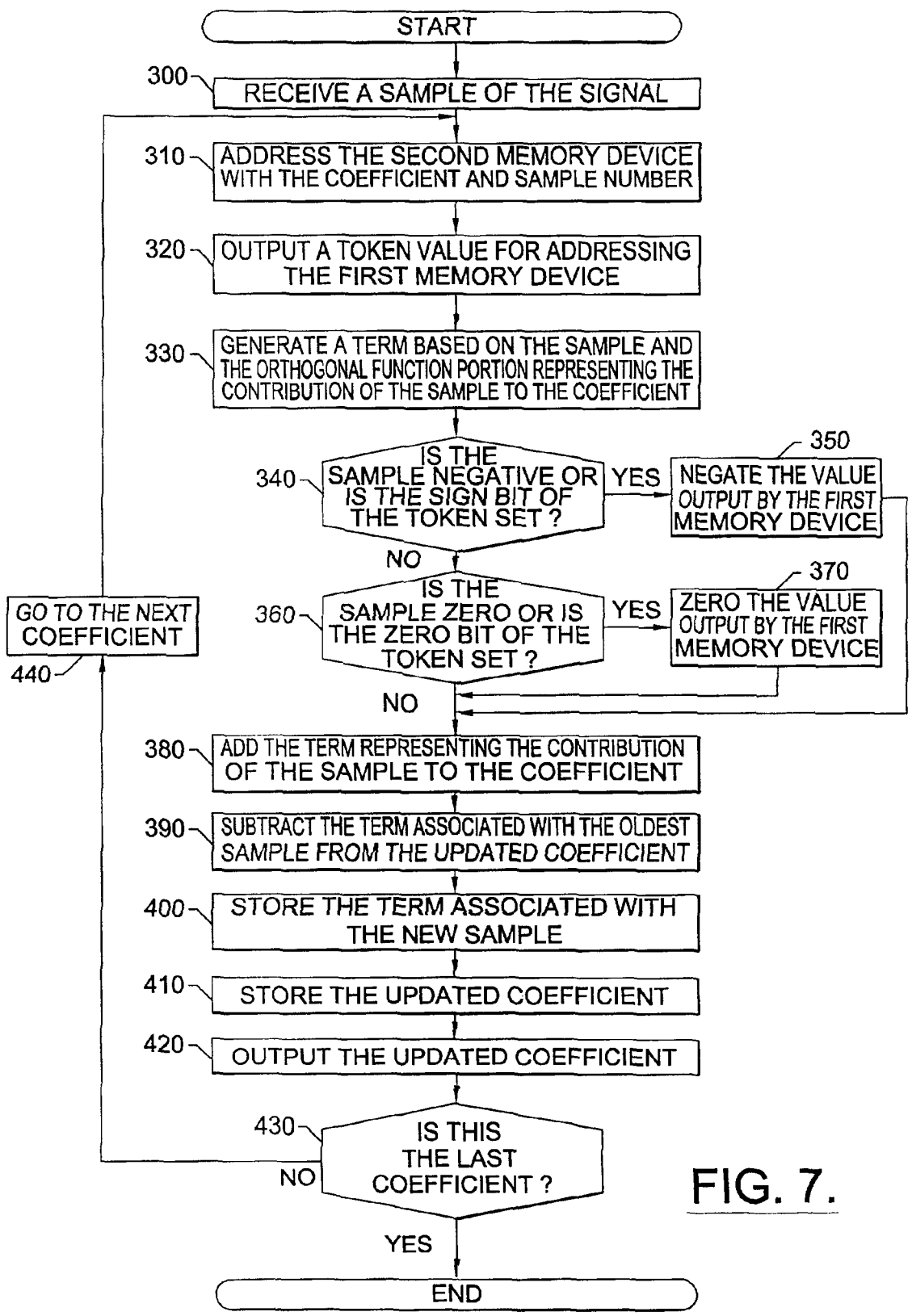
FIG. 7 is a block diagram of the operations performed to determine the coefficients of a function representative of an input signal based on a plurality of samples of the input signal using memory devices and gates, where for each sample received, a set of coefficients are output according to one embodiment of the present invention.

With reference to FIG. 7, in operation in this embodiment, similar to previous embodiments, for each sample, the receiver receives a sample of the signal and inputs the sample to the first memory device 22. (See step 300). For each coefficient, inputs, 18 and 20, are provided to the second memory device representing the sample number and coefficient number, (see step 310), and based on the inputs, the second memory device outputs a token. (See step 320). Based on the token and sample, the first memory device generates a term representing the contribution of the sample to the coefficient. (See step 330).

If either the sign of the signal is negative or the sign bit of the token is set, the second AND gate outputs a carry bit to the adder 36. The adder will make the output of the first memory device negative. (See steps 340 and 350). Likewise, if either the signal or the token indicates a zero value, a zero value is output by the first AND gate 28. The zero value is output to the first memory device, which disables the first memory device. Due to the disablement of the first memory device, the null or pull down device 34 outputs a zero value representing the value of the coefficient. (See steps 360 and 370). For the zero case, sign is ignored. The term of the coefficient is then output.

The term is next provided to the adder 44, which also receives the previous value of the coefficient from the third memory device 48. The third memory device is also connected to the second memory device. The token from the second memory device addresses the coefficient stored in the third memory device, which, in turn, is output to the adder for adding to the term. The term is added to the existing coefficient by the adder. (See step 380). This is continued until all of the samples have been received and the coefficients based on the samples have been calculated to thereby provide coefficients based on a first set of samples.

As illustrated in the various embodiments above, apparatus, methods, and computer program products process a plurality of samples and generate the coefficients of the function based on the samples. In some embodiments of the present invention, after the plurality of samples have been received, the apparatus, methods, and computer program products of the present invention output the generated coefficients, reset the coefficients, and again take samples of the signal. In some embodiments, however, it may be advantageous to generate and output a complete set of coefficients as each new sample is received and processed. This is referred to as a Sliding Aperture Fourier Transform (SAFT).

In this embodiment, the apparatus, methods, and computer program products of the present invention do not reset each of the coefficients to zero after the final sample of a plurality of samples has been received and the coefficients have been output. Instead, the apparatus, methods, and computer program products of the present invention replace the first sample of the previous plurality of samples with the next received sample. Using this new sample, the apparatus, methods, and computer program products of the present invention output a next set of coefficients. As such, instead of generating a set of coefficients for each "batch" of samples, the apparatus, methods, and computer program products of the present invention generates a set of coefficients each time a new sample is received, thereby providing a new set of coefficients for each time a new sample is received.

The present invention provides several apparatus, methods, and computer program products for generating a set of coefficients each time a new sample is received. In each of these embodiments, the apparatus, methods, and computer program products of the present invention replace the contribution of the first sample of the previous plurality of samples with the contribution of the next sample received and then output the new coefficients. For example, in one embodiment, the apparatus, methods, and computer program products of the present invention initially store each of the samples as they are received and generates a first set of coefficients when the last sample of the plurality of samples has been received. Further, when a new sample of the input signal is received, (after the predetermined plurality of samples has already been received), the apparatus, methods, and computer program products of the present invention apply the mathematical function associated with the coefficients to the new sample and generate a term based on the new sample for each coefficient. To replace the new sample with the first sample of the plurality of the samples, the generated term of the new sample is subtracted from the term associated with the first sample of the predetermined plurality of samples that was previously stored in a memory device. Following this subtraction, the coefficients are updated by the difference between the terms based upon the new sample and the first sample of the predetermined plurality of samples.

In another embodiment of the present invention, to replace the new sample with the first sample of the plurality of samples, the apparatus, method, and computer program products of the present invention subtract the term based upon a first sample of the predetermined plurality of samples from each of the coefficients and adds the term based upon the new sample to each of the coefficients. As such, in one embodiment, the terms for the new and oldest sample are first subtracted from each other and the remainder is added to the coefficients, while in another embodiment, the term associated with the oldest sample is subtracted from each coefficient and the term associated with the new sample is added to the coefficients. This second embodiment typically experiences less computational drift and is illustrated in FIG. 6.

In this embodiment, the coefficient generator of FIG. 6 further includes a fourth memory device 66 in digital communication with the third memory device 48 for storing the terms associated with each sample of a plurality of samples. The coefficient generator further includes an adder 68 in digital communication with the third and fourth memory devices for subtracting the term associated from the first sample of a previous plurality of samples from the term associated with newly received sample. The fourth memory device is also connected to the second memory device.

In this embodiment of the present invention, after the initial coefficients have been determined from the original set of samples, as each new sample is received, the coefficients are updated with the information from the new sample and the contribution of the oldest sample is subtracted to provide a sliding aperture Fourier transform. Specifically, with reference to FIGS. 6 and 7, the token from the second memory device addresses the term stored in the fourth memory device representing the term associated with the first sample of the plurality of samples, (i.e., the oldest sample). The term is provided to the adder 68, where the term is subtracted from the updated coefficient. (See step 390). The term associated with the new sample is stored in the fourth memory device, (see step 400), the updated coefficient is stored in the third memory device, (see step 410), and also output. (See step 420). The above steps are repeated for each coefficient until all of the coefficients have been updated with the sample. (See steps 430 and 440).

The apparatus, methods, and computer program products of the present invention may be used in parallel for a series of channels for which the present invention generates for each channel coefficients of a function representing a signal on the channel. As detailed above, the present invention determines the coefficients of the function representative of signal by combining each sample upon receipt with the mathematical function associated with the sample and the coefficient. Further, as detailed above, the different combinations of the samples and coefficients may be pre-calculated and stored in an addressable memory device or may be computed by a gated function with reference to a value associated with the token. Typically, the tokens that address the cells of the memory device are derived from state information obtained from the counter indicating the coefficient and the sample. While in the normal operation, the tokens and memory device are used to determine the coefficients of a function that is representative of a signal, these tokens and memory devices may also be used repetitively by adding bits to the counter at appropriate locations and thus service a multiplicity of channels. In this configuration, additional coefficient memory cells maintain the additional coefficients, and a channel number may be output as a convenience to the user. It is still possible employ an electrical signal to determine the forward coefficients or to determine the inverse function of the input.

Further, while in the normal operation, the tokens and memory device are used to determine the coefficients of a function that is representative of a signal, these tokens and memory devices may also be used repetitively by adding bits to the counter at appropriate locations and thus service a multiplicity of channels. In this configuration, additional coefficient memory cells maintain the additional coefficients, and a channel number may be output as a convenience to the user. By letting consecutive samples be treated as different channels it is possible to thus produce interleaved transforms. The interleaved transforms may be sent to a second similar process to produce two-dimensional transforms, for example.

In one embodiment of the present invention, the apparatus described in FIG. 6 is configured to correct the updated coefficients by incorporating additional electronic components (not shown in FIG. 6) to convert the coefficients to the correct reference system, specifically, to rotate the reference system. The additional electronic components may include components such as components that use gates, such as multipliers, adders, dividers, or other gated functions. Alternatively, embodiment to the present invention the apparatus described in FIG. 6 may use memory and stored functions to provide a rotating reference system. For Fourier transform calculations, the additional components or memory will derive corrected coefficients according to equations such as equation (14) and equation (17).

As mentioned previously, the coefficient generator of FIG. 6 provides a SAFT configuration that allows the coefficients to be updated on a continuous basis as each new sample is received by subtracting the effects of the oldest sample and adding the effects of the new sample. As illustrated above, this can be done typically in two ways. First, the effects of the oldest sample may be recalculated, subtracted from the coefficients, and the new effects of the new sample added to the coefficients. Similarly, the effects of the old sample may be calculated, subtracted from the effects of the new sample, and the remainder then added to the coefficients. Although these methods provide a SAFT technique that allows for continuous updates of the coefficients as each new sample is received, because they merely replace the oldest sample with the newest sample, they do not address the problem with the first sample of the new set beginning at 2*45 degrees as opposed to 45 degrees, (in situations where N=8).

Figure 8:
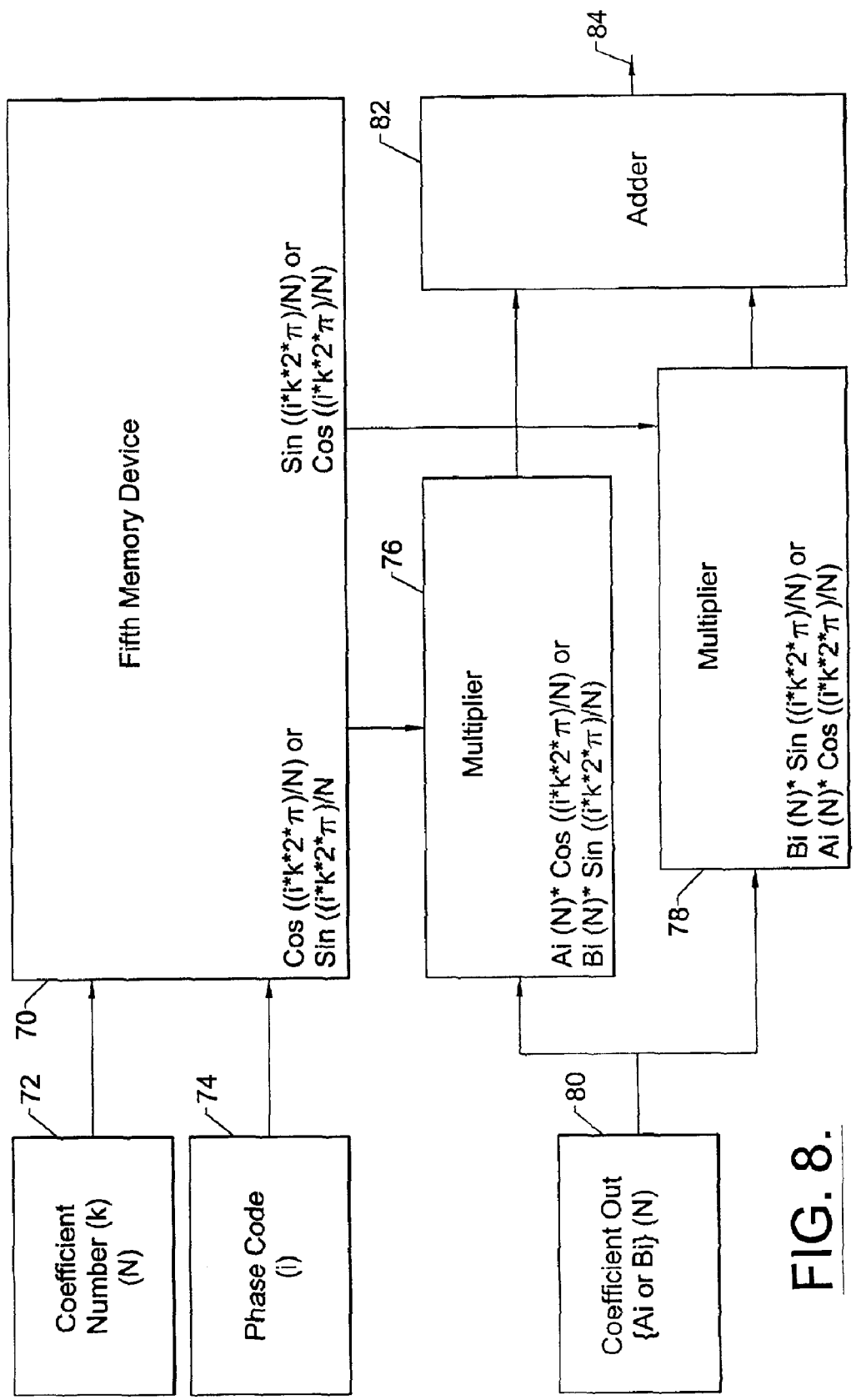
FIG. 8 is a block diagram of an apparatus for applying the rotating reference in performing coefficient corrections for use with apparatus such as that shown in FIG. 6 according to one embodiment of the present invention.

In light of this, in one embodiment, the present invention provides a coefficient generator that corrects the coefficients by rotating the reference system of the samples to thereby provide a classic DFT. Specifically, the fourth memory device 66 and adder 50 of the embodiment illustrated in FIG. 6 merely subtract the effect of the oldest sample and add the effects of the newest sample. But, the embodiment of the present invention further compensates the coefficients by rotating the reference system such that when the oldest sample is subtracted and the newest added, the samples have the correct angular values for calculation. Specifically, with reference to FIG. 8, there is shown a block diagram for the architecture of an apparatus according to one embodiment of the present invention to correct Fourier transform coefficients using the rotating reference system. The apparatus shown in FIG. 8 is suitable for use with the coefficient generating apparatus such as that described in FIG. 6. Specifically, FIG. 8 shows the additional logic required to attach a coefficient correction to the coefficients generated in the apparatus described in FIG. 6. Importantly, the apparatus of FIG. 8 implements the calculations of equation (14) to compensate the coefficients for the difference in angular rotation of the samples.

In particular, apparatus of this embodiment includes a fifth memory device 70 for connection to the coefficient number 72 output and phase code 74 output of the latch 62. The memory device includes an array containing precalculated values for the sine and cosine contributions associated with each coefficient and sample number. For example, if the coefficient generator determines 8 coefficients using eight samples, the array of the fifth memory device will include all of the calculated values for each coefficient number and sample combination for the sine and cosine portions of the compensation equation (14).

The apparatus of the present invention also further includes two multipliers 76 and 78 connected to both the fifth memory device and the coefficient out output 80 of the latch 62, shown in FIG. 6. The first multiplier 76 multiplies the cosine portion of equation (14) by the coefficient value output by the latch 62 and the second multiplier 78 multiplies the sine portion of equation (14) by the coefficient value output by the latch 62. Connected to the multipliers 76 and 78 is an adder 82 having an output 84 with the corrected coefficient.

Figure 9:
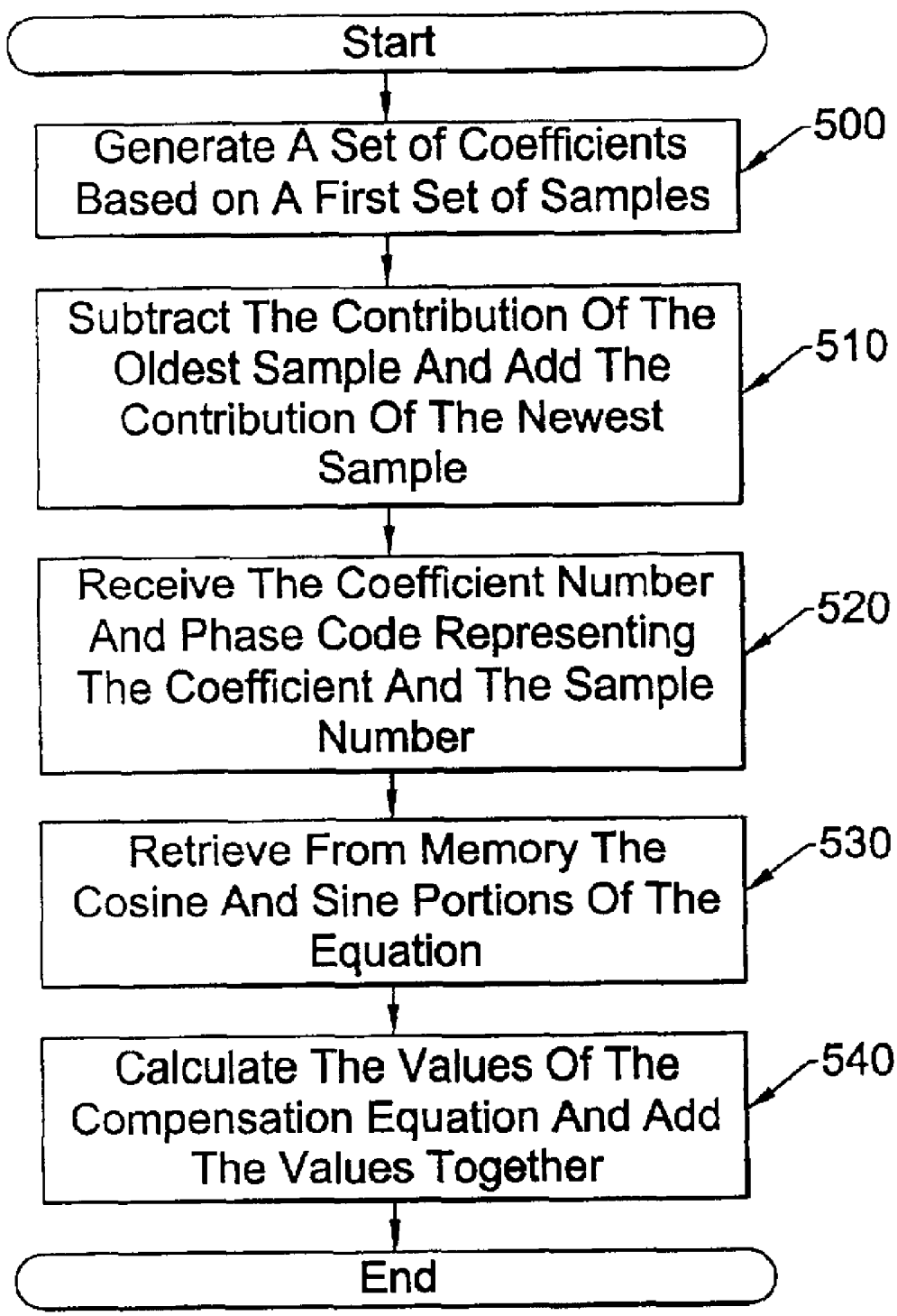
FIG. 9 is a block diagram of the operations performed to apply the rotating reference in performing coefficient corrections for use with apparatus such as that shown in FIG. 6 according to one embodiment of the present invention.

With reference to FIG. 9, the operation of the apparatus to correct Fourier transform coefficients using the rotating reference system is illustrated. Specifically, as illustrated in FIG. 6, the coefficient generator initially generates a set of coefficients based on a first set of samples. (See step 500). After the first set of samples have been received and the coefficients calculated and the next sample is received, the fourth memory device 66 and adder 68 of the coefficient generator will subtract the contribution of the oldest sample and add the contribution of the newest sample. (See step 510). As stated above, the fourth memory device 66 and adder 68 do not compensate for the angle rotation of the samples due to the dropping of the oldest sample and adding the newest sample. In light of this, the apparatus of the present invention illustrated in FIG. 8, provides this compensation.

Specifically, from the latch 62 of the coefficient generator, the fifth memory device 70 receives the coefficient number 72 and phase code 74, respectively representing the coefficient and the sample number. (See step 520). Based on these values, the fifth memory device retrieves from the array of stored values the cosine and sine portions of the equation (14) associated with the coefficient and sample number, and sends these values to the multipliers, 76 and 78. (See step 530). Specifically, if the coefficient number is 7 and the sample is 5, the fifth memory device will provide the cosine and sine portions of equation (14) that correspond to these values. The multipliers respectively receive the cosine and sine values from the fifth memory device, and they also receive the coefficient value 80 from the latch 62. This coefficient value has been previously compensated by subtracting out the contribution of the oldest sample and adding the contribution of newest sample by the fourth memory device 66 and the adder 68. Using these values, the multipliers calculate the values of the compensation equation (14), and the adder 82 adds the values from the multipliers to provide the corrected Fourier transform coefficient using the rotating reference system. (See step 540).

An additional aspect of the present invention is the independent of samples. Specifically, because each sample affects each coefficient of the other coefficients, a coefficient of interest may be selected for updating, while the other coefficients are not. This aspect allows the user to track one coefficient without calculating all of the other coefficients.

As stated earlier, there is a need for methods and apparatus that allow faster generation of coefficients and/or that require simpler hardware configurations. Furthermore, it was stated earlier that embodiments of the present invention can use a variety of techniques for generating coefficients in sliding aperture Fourier transform applications. Improved coefficient generation techniques and hardware can further improve the usefulness of SAFT for providing updated coefficients and for providing updated and corrected coefficients.

In response to that need, other embodiments of the present invention pertain to automatically determining models for generating coefficients of functions representative of a signal. These embodiments use learning techniques for determining the models. In general, transforms, such as the Fourier Transform, are mappings between variables. The main definition of a mapping is usually analytical. Several models of computation for a mapping may be determined; some models are more efficient than others depending on what computing technology is employed.

The definition of the Fourier Transform relates variables in time domain with variables in the frequency domain. In the case of the DFT, the mapping is between successive samples in time and coefficients of certain frequencies. Coefficients may change at every sample and characterize a group of samples including the most recent one. Computational methods of calculating the coefficients include mapping between any parameter that has sufficient information and the values of the coefficients. In particular, the computational model may be a mapping between an input that is composed of the last set of coefficients plus the latest sample and an output that is the new set of coefficients. In fact, there could be several such models.

One embodiment of the present invention includes a method of determining the models automatically when trained from input-output data describing the mapping between samples and Fourier coefficients. The techniques described are general and apply to learning models for any mappings. As a particular case, most of examples presented here will refer to learning computational models for mappings between last set of coefficients plus latest sample and the new set of coefficients. Unlike the standard technology, embodiments of the present invention apply these approaches to functions like the Fourier Transform, the Laplace Transform, as well as polynomial and series formulas. Generally, embodiments of the present invention produce a computationally simpler, faster, or more parallel hardware realization. Some embodiments of the present invention may include but are not limited to techniques like the Sample Integrated Fourier Transform (SIFT) and SAFT methods described in U.S. patent application Ser. No. 09/560,221 and PCT Application No. WO 00/67146..

The solution models may be exact or approximate. Each of the methods shown here is used to develop solutions to mapping functions of the sets described. Although the models are each based on different disciplines and require different methodology, they are similar in that they employ error evaluations and decisions to select sufficiently small errors to satisfy the needed parameters. The embodiments given are not exhaustive and are intended only to show, as examples, members of the family of approaches that apply. To those skilled in the art, it is clear that alternative embodiments of the present invention can be derived by picking some similar method of evaluation and decision making to again approach the same functions in a slightly different way.

A diversity of learning modeling and approximation modeling techniques are suitable. Examples of two kinds of modeling techniques are discussed. The first technique involves using specialized structures as universal functional approximators exemplified here by neural networks and fuzzy logic. The second technique involves using a general approximation (model identification) scheme, which works for any structure, and for which the pieces of the model are synthesized by a search technique, here exemplified by a Genetic Algorithm.

Examples of elementary blocks for the specialized structures are neurons for the neural approximators and fuzzy rules for the fuzzy systems approximators. For both types of approximators, universal functional approximation properties have been formally demonstrated. Fuzzy logic processors are known in the art and are commercially available. Fuzzy logic processors are available, as an example, in the form of computer executable code that can be run on computers or other electronic devices. Similarly, neural network processors are commercially available. Neural networks can be executed as software in the form of computer executable code. Furthermore, neural network chips are commercially available that can be used as neural network processors.

An embodiment of the present invention includes a neural network chip trained with predetermined samples and predetermined coefficients to map coefficients to input samples. As a further embodiment, the neural network chip is connected with a receiver for receiving samples. The samples are transmitted to the neural network chip so that the neural network chip can generate coefficients or coefficient updates based on the samples. Another embodiment of the present invention includes a fuzzy logic processor chip trained with predetermined samples and predetermined coefficients to map coefficients to input samples. As a further embodiment, the fuzzy logic processor chip is connected with a receiver for receiving samples. The samples are transmitted to the fuzzy logic processor chip so that the fuzzy logic processor chip can generate coefficients or coefficient updates based on the samples.

In the case of a general approximation scheme, the basic elementary blocks can be of almost any nature. If used to explore an electronic circuit solution, the elementary blocks could be, for example, logical gates or higher level digital building blocks such as adders and multipliers, transistors, operational amplifiers, and R, L, C components. In this case, there are no proofs of universal approximation, except for particular cases, e.g., implementation of any logical function using only NAND gates, etc. The area of general approximators for which elementary building blocks are electronic components and the model identification is based on evolutionary/genetic algorithms is also referred to as Evolvable Hardware (EHW).

A feature of some embodiments of the present invention is that the approximation can be to any degree of accuracy. In other words, the degree of accuracy is a parameter that can be controlled. This is advantageous because for some applications a high degree of accuracy will be desired, whereas, other applications to tolerate less accuracy.

An important step in using learning models involves generation of data for learning and training. Model identification for the previously described approximators is usually based on some training/learning/search procedure. In this case, a set of input-output pairs obtained from the system to be modeled are used for training. In the case of determining coefficients for a Fourier series, the training pair consists of pairs of vectors such as, for example, samples and coefficients. For a SAFT problem, the pairs could be samples and coefficient updates. The choice of the correct training set has great influence on the feasibility of the modeling. The examples that follow use 8 samples coded on 5 bits.

Consider, for example, the model to be determined by the mapping expressed linguistically:

"At each new sampling time, the value of the sample together with the value of the current set of coefficients (input+current state) determines the new set of coefficients.

coefficient (t+1)=function (sample(t+1),coefficient(t))."

First, generate a random vector that will be the input samples in the time domain. The size of the vector may be dependent on the model. It is to be understood that, usually, there will be a training pair corresponding to each sample index; the training pair can be considered as an equation linking inputs and outputs. The number of equations that may be needed depends on multiple factors; for example, the number of equations may depend on how many variables are in the model. If a linear model is possible, then a linear transformation is calculated, and a number of equations equal to the number of unknowns will give an exact solution. Fewer equations (i.e. training pairs) will be insufficient for generalization. Typically, more equations are needed if the data are probabilistic.

The next step is to generate the Fourier Coefficients for each group of samples (considering a set of 8 samples, a group would be samples number 1–8, 2–9, 3–10, and so on) by whatever method is convenient. Examples of convenient methods for Fourier coefficients are FFT, butterfly, and SIFT, (described in U.S. patent application Ser. No. 09/560,221 and PCT Application No. WO 00/67146). This means that for each sample index, there is a set of coefficients that characterizes the samples in the window that ended with this index sample. This set of coefficients is the desired target output for training. In another embodiment, the problem may be decomposed in models that calculate only one coefficient, in which case the vector consisting of values of that coefficient are the target.

In this example, the input for training will be the combined set consisting of the last sample and the set of coefficients corresponding to the samples in the prior window, i.e. until the sample prior to the index sample. More specific, for windows of 8 samples, the input-output training pairs would be pairs corresponding to each index: input consisting of 1 value for sample at (t+1) and 8 values for coefficients at time t, and the output consisting of one or more coefficients at time t+1.

Table 1 illustrates code for generating data for learning and training models.

TABLE 1

Example MatLab Code for Generating Data for Learning and Training Model for Mapping Fourier Transform Coefficients

```
%we prepare a larger collection of samples, not all may be necessary for
training nsamp=200;
Samples=(round(rand(1,nsamp+8)*31))/31;
%initialize coefficient matrix on the columns will be the 8 coef.
%to preserve the same index it is made of size nsamp+8, but the first 8
will not be occupied or used in training, the proper training set being
from 8 to nsamp+8
Coef=zeros(8,nsamp+8);
for i=8:nsamp+8
SampleWindow = Samples(i-7:i);
%here we use SIFT to create the outputs, buy any method giving the
Fourier
Coefficient can be used
[otto,OutT]=sift(SampleWindow);
Coef(:,i)=OutT;
end
%The input-output training pairs are thus defined:
%initialize matrices first
Input=zeros(8,nsamp);
Output=zeros(8,nsamp);
for j=1:nsamp
Input(:,j)= [Samples(j+8); Coef(:,j+7)];
Output(:,j)=Coef(:,j+8);
end
%divide in a training set and a test set (half each)
sizesample=size(Input,2);
sizetrain=100;
% this model will calculate coefficients separately, use 9 inputs and 1
output.
input is (sample and 8 current coefficients), output is one coefficient
%prepare a training set and a test set, not used in training but used to
verify the model
j=1;
p=Input(:,1:sizetrain);
t=Output(j,1:sizetrain);
ptest = Input(:,sizetrain+1:sizesample);
ttest = Output(j,sizetrain+1:sizesample);
```

One embodiment of the present invention involves neural modeling. Neural modeling uses neurons as the main building blocks. The neurons are computational blocks that map a set of inputs to an output. The mapping is usually a function, commonly nonlinear, of the aggregated total contributions of all inputs. Each contribution is multiplied by a weight factor.

The neurons are interconnected in some topology such that the output of some of neurons provides input for others. They could be organized into groups called layers and interconnections restricted to interlayer networking. For instance, all neurons in layer one have outputs routed to all neurons in layer two. Each link between neurons has an associated weight, and it is common for neurons to have an associated bias term. The learning of the neural model usually involves the determination of the topology of interconnections, the values for the weights, and the values for biases. The topology of interconnections is usually imposed by the trainer.

Figure 10:
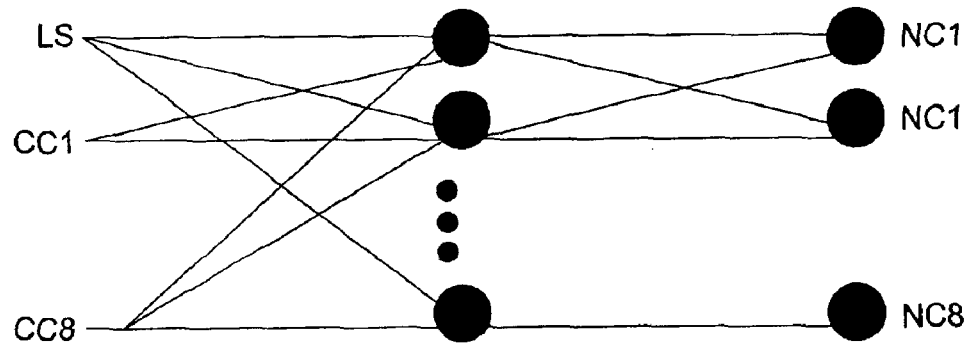
FIG. 10 is a model of a neural network mapping last set of coefficients and most recent sample to next set of coefficients according to one embodiment of the present invention.

Reference is now made to FIG. 10 wherein there is shown an embodiment of the present invention. FIG. 10 illustrates a model of a neural network mapping a last set of coefficients and most recent sample to next set of coefficients. The definitions for the abbreviations are: LS—Latest Sample; $CC_i$—Current Value of Coefficient i, (i=1:8); and $NC_i$—New Value of Coefficient i. For the example of training a neural network to learn the mapping between the pairs, inputs are established including one value for the sample at time t+1 and eight values for coefficients at time t. The output includes eight new coefficients at time t+1. A simple gradient descent routine is often suitable for modifying the weights to minimize a measure of the difference between outputs provided by the neural model and the target output. An example of a suitable measure of the difference is a measure such as the mean square error.

An example of the MatLab code for this problem is as follows:

% coef(t+1)=function(sample(t+1)+coef(t)) range= minmax(p);

% create a network with 3 neurons in first layer and one in out layer, % with pure linear characteristics, training by Levenberg-Marquardt % backpropagation net3= newff(range,[3 1], {'purelin' 'purelin'},'trainlm');
net3=train(net3, p,t);

In a few iterations, a neural model can be found using this code. This particular problem can actually be solved with one layer such as the following:

net3=newff(range,[1], {'purelin'},'trainlm');
net3 =train(net3,p,t);

As a particular case, the mapping may be a linear transformation, in which case the set of equations is A*X=B, where A are input values, X is the transform matrix, B is the Output set. In the particular case of interest for 9 training pairs, 9 equations with 9 unknowns A is 9 by 9, X is 9 by 8, B is 9 by 8. The first index is for the 9 training pairs. The solution can be found by X=A\B. Table 2 shows an example of MatLab code for this case and the results.

TABLE 2

Example MatLab Code and Results for Neural Model

%determine a linear mapping between
% (new sample +8 Fourier coef) to (8 new Fourier coef)
%this uses a linear model
%A is the set of inputs from a training set TABLE 2-continued Example MatLab Code and Results for Neural Model

```
%these are 9 raw vectors/examples, each with 9 terms
%the first is the new sample and the remaining 8 are the
%coefficients of the 8 samples window before this new sample
%X is the unknown model (a 9×8 matrix)
%B is the output
sizesample=size(Input,2);
sizetrain=9;
%initialize a matrix (works faster)
X=zeros(9,8);
%calculate each column of the X matrix by solving a sys of linear eq.
for j=1:8
   p=Input(:,1:sizetrain);
   t=Output(j,1:sizetrain);
A=p';
B=t';
X(:,j) = mldivide(A,B);
%this is the same command as
%X(:,j)= A[B]
end
% display it
X
%test on other pairs
t=Output(:,1:sizetrain);
ptest = Input(:,sizetrain+1:sizesample);
ttest = Output(:,sizetrain+1:sizesample);
%calculate for ptest inputs
strange=(ptest'*X)';
%and see is equal to desired values
sis=ttest;
THE RESULT IS
%X =
%
%       Col 1    Col 2    Col 3    Col 4    Col 5    Col 6    Col 7    Col 8
%      1.0000   1.0000   1.0000   0.5000   0.0000  -0.0000  -0.0000   0.1250
%      0.5303  -0.1768  -0.1768  -0.0884  -0.7071   0       -0.0000  -0.0221
%     -0.0000   0.0000   0.0000   0.0000   0.0000  -1.0000   0.0000  -0.0000
%      0.1768   0.1768  -0.5303   0.0884   0.0000  -0.0000  -0.7071   0.0221
%      0.2500   0.2500   0.2500  -0.8750  -0.0000   0.0000   0.0000   0.0312
%      0.5303  -0.1768  -0.1768  -0.0884   0.7071   0.0000  -0.0000  -0.0221
%     -0.2500   0.7500  -0.2500  -0.1250  -0.0000   0.0000  -0.0000  -0.0313
%     -0.1768  -0.1768   0.5303  -0.0884   0.0000   0.0000  -0.7071  -0.0221
%     -1.0000  -1.0000  -1.0000  -0.5000  -0.0000   0.0000  -0.0000   0.8750
%
pause
%more verifications
%a first set of 8 samples
SampleValid=[1 0 0.2 0.7 0.3 0.8 0.1 0.5]
%coefsvcolumn are their F coef
[coefsv,coefsvcolumn]=sift(SampleValid)
%the new 8 samples (slided, new one is 0.4)
SampleValid2=[0 0.2 0.7 0.3 0.8 0.1 0.5 0.4]
%coef for samplevalid2 calculated by SIFT (rococo)
[roc,rococo]=sift(SampleValid2)
%coef 1 for samplevalid2 calculated by matrix multiplication with X
%new vector input (sample + coef)
vec2test=[0.4; coefsvcolumn]
%NEXT LINE IS THE ONLY COMPUTATION
ansbyinv=(vec2test')*X
rococo'
%more tests
SampleValid=[0 0 0 1 0 0 0 0]
[coefsv,coefsvcolumn]=sift(SampleValid)
SampleValid2=[0 0 1 0 0 0 0 0]
%coef for samplevalid2 calculated by sift
[roc,rococo]=sift(SampleValid2)
%coef 1 for samplevalid2 calculated by nn
vec2test=[0; coefsvcolumn]
ansbyinv=(vec2test')*X
rococo'
```

Another embodiment of the present invention includes fuzzy logic modeling. A fuzzy model is characterized by a set of rules that map the inputs to outputs. In the following, the example will refer directly to the Fourier mapping for 8 samples, with the input consisting of 1 value for sample at (t+1) and 8 values for coefficients at (t), and the output comprising coefficient(s) at time t+1. Following notations will simplify the writing: LS—Latest Sample; CCi—Current Value for Coefficient i, (i=1:8); NCi—New Value for Coefficient I; NB—Negative Big; NM—Negative Medium; NS—Negative Small; ZR—About Zero; PS—Positive Small; PM—Positive Medium; and PB—Positive Big.

For embodiments of the present invention, a possible fuzzy model for first coefficient NC1 could be "If LS is NS & CC1 is NM & CC2 is PM & ... CC8 is PB then NC1 is PM"

...

"If LS is PL & CC1 is NS & CC2 is ZR & ... CC8 is PB then NC1 is PB."

Figure 11:
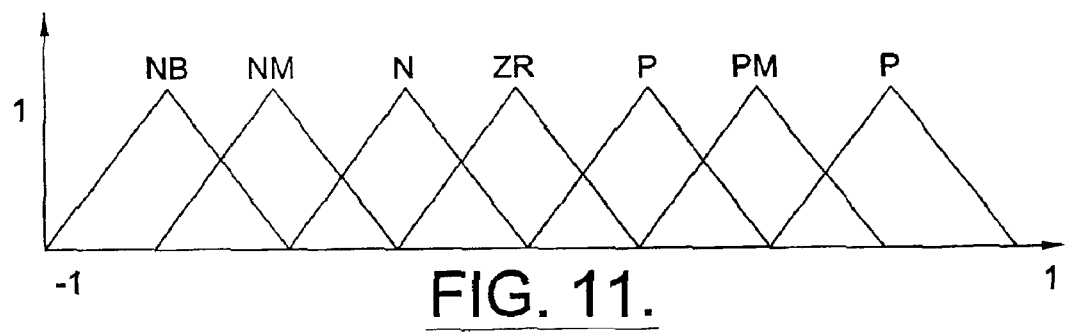
FIG. 11 illustrates graphically possible fuzzy logic membership functions at start-up of training according to one embodiment of the present invention.

Typically, the number of rules depends on the problem and the degree of approximation desired. The meaning of the linguistic sets NS-PB associated with fuzzy sets defined on the normalized domain [−1,1] can be as shown in FIG. 11.

The main variables of the fuzzy model are the rules and the fuzzy sets. Other variables may be used in modeling, such as the inference type, the interpretation of the fuzzy connectives in the rules (i.e. & as logical AND can be interpreted by MIN, Product, or more general as parametric t-norm, OR can be interpreted by MAX, Probabilistic sum, parametric s-norm).

Consider here, for example, that essentially all parameters are fixed except rules and membership functions/fuzzy sets. These variables will be altered by a learning mechanism to minimize the distance between the output of the model and target.

Examples of suitable learning mechanisms are gradient-based mechanisms and genetic algorithms.

Figure 12:
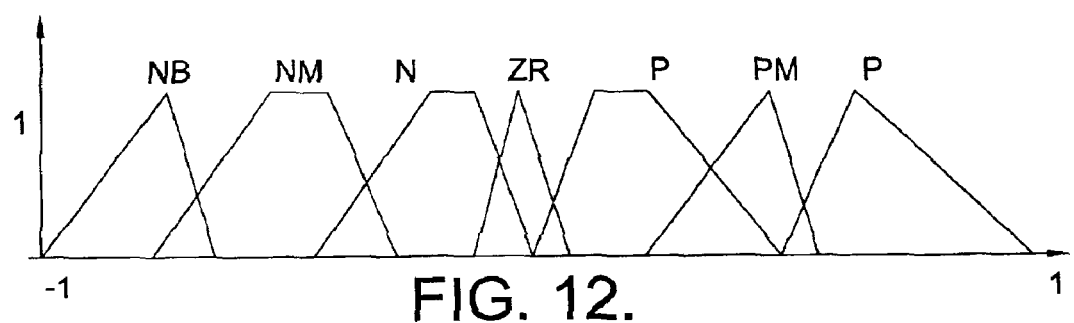
FIG. 12 illustrates graphically possible fuzzy logic membership functions at end of training according to one embodiment of the present invention.

Training (model identification) may include a variety of designations. For example, Sample LS=−0.8 can be evaluated as 0.8 NS and 0.2 NM and entered in the rule evaluation as such. Extra rules may be added; some of the terms in the rules may be missing. Eventually, after training or tuning, the membership functions may appear as shown in FIG. 12.

Typically, Evolutionary Algorithms are multi-iteration, generate-and-test, parallel search algorithms that implement mechanisms of selection of the fittest in a set of candidate solutions and create new candidates by inter-breeding the fittest solutions. In particular, embodiments of the present invention, the sought-for candidate solution is a computational solution to the Fourier mapping. The solution could be algorithmic such as a set of instructions in a given machine usable language. Alternatively, the solution could be analytic such as in the sense of an expression based on a set of allowed operators. As another alternative, the solution could be electronic such as in the sense of a circuit based on a set of primitive components such as gates, transistors, and resistors. If the desired solution is electronic, the candidate solutions could be represented in the form of hardware description languages such as, for example, VHDL, Verilog, and Spice net-lists with a number of components in a certain arrangement. Typically, candidate solutions differ in at least one of number of components, type of components, and arrangement of components.

The technique of applying evolutionary algorithms to search the space of possible computer programs is called Genetic Programming (GP) and has the goal of reaching a sequence of instructions that produce a desired outcome. The GP-based search for a program can be in any language, from very high-level powerful languages with high-expression power to machine languages. Solutions in high-level languages may need to be compiled or assembled to the CPU's machine language for execution. Searching for a program is but one option. Another option involves searching directly for a program implementation in hardware, such as a circuit solution.

Recent hardware devices are flexible enough to allow reconfiguration and programming of their architecture. Programs describing a Field Programmable Gate Array (FPGA) function can also be evolved as high-level instructions and then converted to configuration commands. Alternatively, the search can be at the configuration command level; this has the possibility of forcing the devices through many tentative configurations as part of the search. Another option is to de-couple the search for an information-processing algorithm from a search for the corresponding hardware implementation after the algorithmic solution is determined. As another alternative, it is possible to perform a unique search for a hardware solution that solves the problem. While the de-coupled alternative has smaller (and possibly better) arranged search space, because of its more powerful representations, the same thing can turn against it if the representations are not well suited for the problem, in which case the unified search is favored.

The idea behind evolutionary circuit synthesis or design is to employ a genetic search or optimization algorithm that operates in the space of all possible circuits and determines solution circuits with desired functional response. The genetic search is tightly coupled with a coded representation for the circuits. Each circuit gets associated with a "genetic code" or chromosome. The simplest representation of a chromosome is a binary string, a succession of 0s and 1s that encode a circuit. Synthesis is the search in the chromosome space for the solution corresponding to a circuit with a desired functional response.

The genetic search follows a "generate and test" strategy in which a population of candidate solutions is maintained each time. The corresponding circuits are then evaluated, and the best candidates are selected and reproduced in a subsequent generation. The process continues until a performance goal is reached. In Extrinsic Evolution, the search for an electronic circuit configuration is made in software, with the intent that the final solution is downloaded, or becomes a blueprint for hardware. The candidate solutions are evaluated as software models of hardware such as, for example, VHDL, Verilog, and Spice net-lists. The evaluations are usually done using a simulator. In Intrinsic Evolution, the candidate solutions are in the form of physical hardware configurations on programmable devices or architectures, which are evaluated with the hardware in the loop using test or evaluation equipment.

Figure 13:
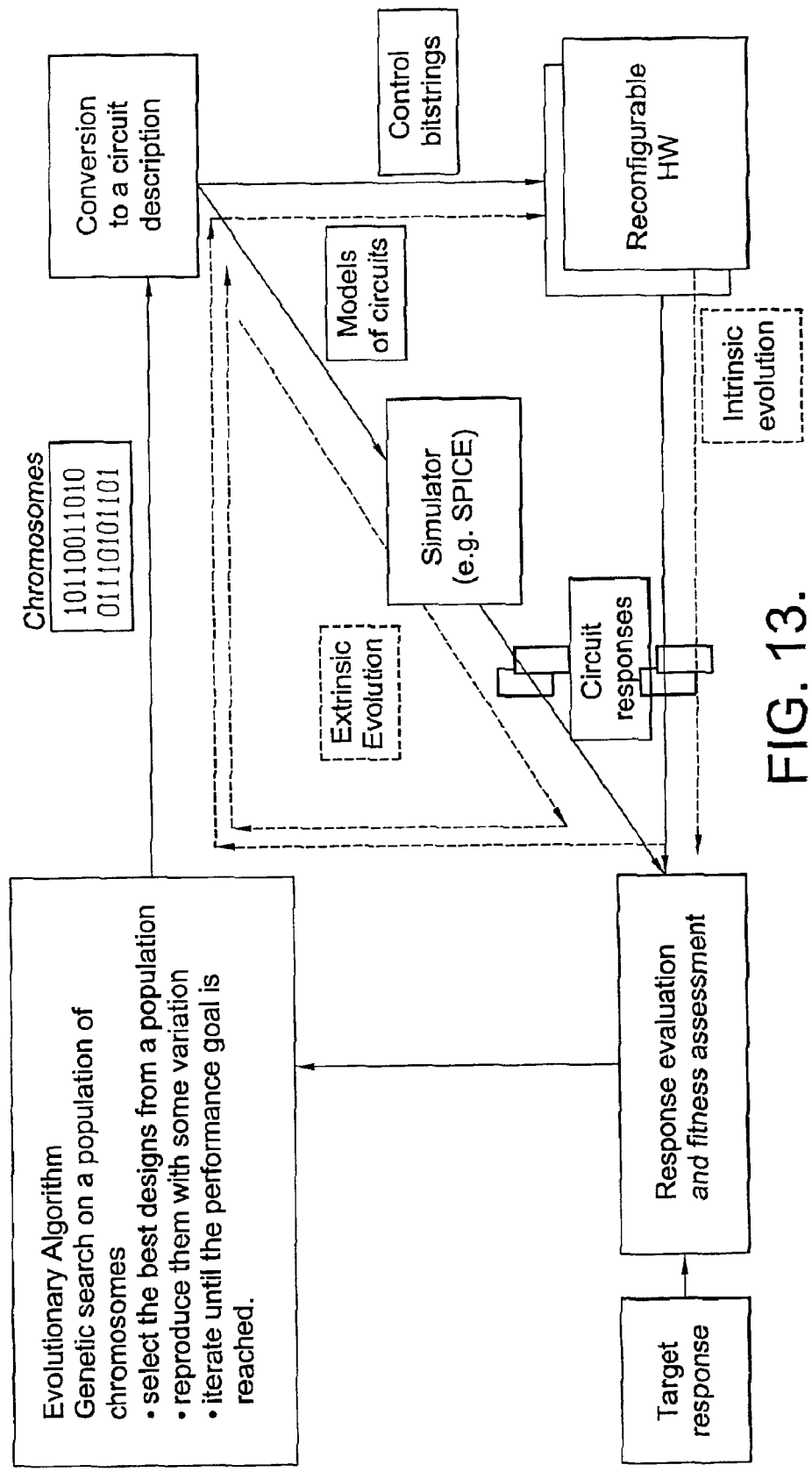
FIG. 13 is an operational block diagram illustrating operational steps used to perform an evolutionary synthesis of electronic hardware.

The main steps of evolutionary synthesis are illustrated in FIG. 13. First, a population of chromosomes is randomly generated. The chromosomes are converted into circuit models or control bit-strings downloaded to programmable hardware. Circuit responses are compared against specifications of a target response, and individuals are ranked based on how close they come to satisfying it.

Considering separate model identification or circuit synthesis for each individual coefficient of the Fourier Transform, the candidate circuits get input values determined by the previous coefficients and latest sample and their target is a new coefficient.

Preparing for a new iteration loop, a new population of individuals is generated from the pool of best individuals in the previous generation. This is subject to a generally random selection of individuals from a best individuals pool, random swapping of parts of their chromosomes (crossover operation) and random flipping of chromosome bits (mutation operation). The process is repeated for several generations, resulting in increasingly better individuals. The randomness helps to avoid being trapped in local optima. Monotonic convergence can be forced by unaltered transference to the next generation of the best individual from the previous generation. The evolutionary and genetic search is considered to be the best choice for very large, highly unknown search spaces. The search process is usually stopped after a number of generations, or when closeness to the target response has reached a sufficient degree. One or several solutions may be found among the individuals of the last generation.

Consider for exemplification the search for an electronic solution composed of CMOS transistors only. The underlying architecture could be based on an arrangement of transistors interconnected by switches as described in FIG. 14. The arrangement of transistors in FIG. 14 can be expanded by adding layers to the right and extra layers between V+ and V− to form a "sea of transistors."

Figure 14:
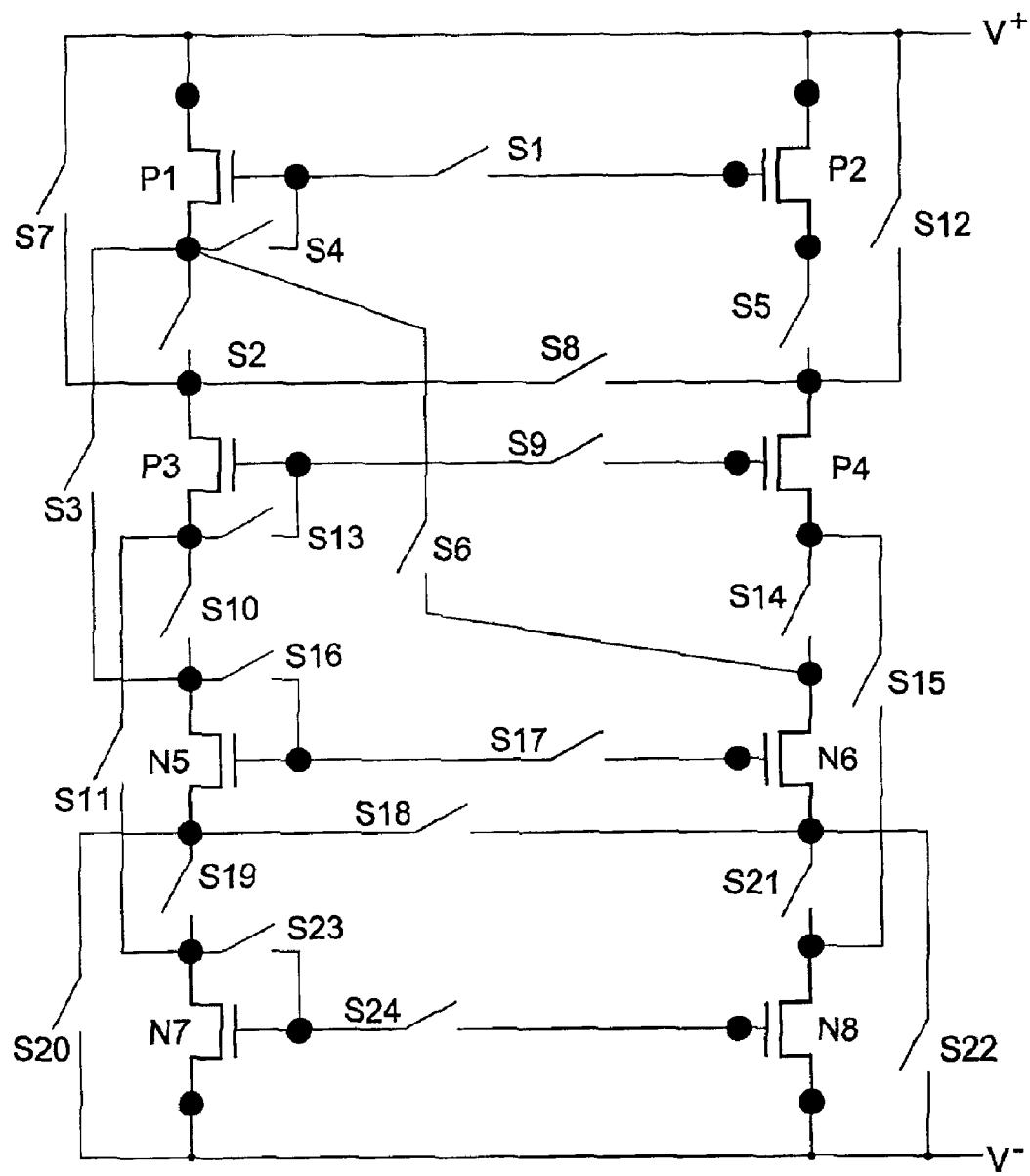
FIG. 14 illustrates a fragment of a "sea of transistors" that can be the skeleton for a transistor model for genetic programming according to one embodiment of the present invention.

FIG. 14 shows a fragment of the "sea of transistors" that can be a skeleton for a transistor model. As an example, consider 9 input signals, corresponding to the input training set and one output. The inputs are connected with programmable switches to different points in the architecture such as the gates of transistors N5, N6, etc. Similarly, the output is connected by switches to intermediate probing points.

Each switch, including those interconnecting transistor terminals, those interconnecting the inputs to the transistors terminals and the transistor terminals to the output (for example, one output as a model is determined for each coefficient independently) has two states associated to 0 and 1, e.g. for closed and open respectively. Thus the transistor model is equivalent to the topology, and is specified by the sequence of 0s and 1s, which will be the chromosome describing a candidate model.

One embodiment of the present invention includes the following steps for a sample and eight coefficients. A population of chromosomes is generated, for example 100 chromosomes. The corresponding Spice net-lists are generated, replacing 0s and 1s with voltages to determine transistors to be closed or open. Each input is connected to a signal source, such as a voltage source. The signal source has a signal pattern dictated by the variation in time of the input training set for a number of samples. The first input signal corresponds to the sample. The next eight inputs correspond to the eight coefficients, respectively. The circuit provides a certain response at the output. The circuit response is compared with the target response. The target response may comprise a parameter such as the coefficient value.

Multiple circuits are tested. Each circuit gets a fitness value depending on how close the output of the circuit is to the target. As an example, the fitness value may be a measure of how small is the sum of the squared errors in a number of points. The best circuits are selected for mating and for inclusion in the next generation. Preferably, the final solution is a circuit with minimal distance between target and output. In addition, for any combination of the inputs (for example, last sample and Fourier coefficients) the final solution, preferably, provides the target output within a predetermined acceptable error.

One embodiment of the present invention is an apparatus that includes a computer readable medium encoded with computer executable steps for calculating and processing DFT coefficients. Wherein the computer executable steps are derived using learning models.

In another embodiment, the apparatus includes an integrated circuit such as an application-specific integrated circuit encoded with executable steps for calculating and processing DFT coefficients. Wherein the computer executable steps are derived using learning models.

In another embodiment, the apparatus includes an integrated circuit such as an application-specific integrated circuit for deriving coefficients of a function. The design of integrated circuit is produced using a learning model.

Another embodiment of the present invention includes methods and apparatus for performing calculations such as DFT and inverse DFT for information processing. The methods and apparatus includes algorithms, or circuits, or algorithms and circuits derived from learning models.

In addition to providing apparatus and methods, the present invention also provides computer program products for determining the coefficients of a function representative of an input signal based on a predetermined plurality of samples of the input signal. The computer program products have a computer readable storage medium having computer readable program code means embodied in the medium. The computer readable storage medium may replace the coefficient generator and perform the functions of the coefficient generator and coefficient contribution generator through software. Further, computer readable storage medium may control the coefficient generator by providing the addresses for determining the coefficients and coefficient contributions.

The computer-readable program code means includes first computer instruction means for receiving each of the samples one at a time. Further, the computer-readable program code means includes second computer instruction means for updating the coefficients of the function based on each sample as the sample is received without awaiting receipt of the next sample and correcting the updated coefficients so that the coefficient contributions incorporate use of the correct angle with the appropriate sample to thereby decrease the latency of the time required to determine accurate coefficients of the function. In a further embodiment, each coefficient is comprised of at least one term that is at least partially based upon a combination of a sample and a mathematical function. In this embodiment, the computer-readable program code means further includes third computer instruction means for determining a respective term of each coefficient by combining each sample upon receipt with the mathematical function associated with the sample and the coefficient.

FIGS. 1–14 and Tables 1 and 2 are graph, block diagram, learning models, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for determining the coefficients of a function representative of an input signal based on a predetermined plurality of sequential samples, wherein said apparatus comprises a coefficient generator that:

initially generates coefficients of the function based on a set of samples;

subsequently updates at least one of the coefficients on the receipt of a new sample; and corrects the coefficients so that the coefficients represent a correct sample sequence, wherein each coefficient is comprised of at least one term that is at least partially based upon a combination of a sample and a mathematical function, wherein to update a coefficient, said coefficient generator determines a respective term of each coefficient by combining each new sample upon receipt with the mathematical function associated with the new sample and the coefficient, and wherein, for each coefficient, said coefficient generator updates the coefficient by adding the respective term to a previous value of the coefficient, wherein the function is a Fourier transform, and wherein the coefficient is updated by said coefficient generator according to the equation $$Ci=(C_{i-1}^2+S_i^2-2C_{i-1}*S_i*\cos(p_{i-1}+180-45*i))^{0.5}$$

where $C_i$ is the updated coefficient, $C_{i-1}$ is the previous coefficient, $S_i$ is the new sample, and $p_{i-1}$ is the phase of the previous coefficient $C_{i-1}$.

2. An apparatus according to claim 1, wherein said coefficient generator simultaneously updates each of the coefficients based on each of the plurality of samples as each sample is received, and wherein when the coefficients are updated and corrected, said coefficient generator outputs the coefficients.

3. An apparatus according to claim 1, wherein said coefficient generator further comprises a memory device, and wherein said coefficient generator further stores each of the samples as they are received in said memory device.

4. An apparatus according to claim 1, wherein there is at least one preselected coefficient of interest, and wherein said coefficient generator receives each of the samples one at a time and updates the preselected coefficient of the function based on each sample as the sample is received, such that the preselected coefficient may be evaluated independent of the other coefficients.

5. An apparatus according to claim 4, wherein said coefficient generator outputs the preselected coefficient each time the coefficient is updated.

6. An apparatus for determining the coefficients of a function representative of an input signal based on a predetermined plurality of sequential samples, wherein said apparatus comprises a coefficient generator that:

initially generates coefficients of the function based on a set of samples;

subsequently updates at least one of the coefficients on the receipt of a new sample; and corrects the coefficients so that the coefficients represent a correct sample sequence wherein each coefficient is comprised of at least one term that is at least partially based upon a combination of a sample and a mathematical function wherein to update a coefficient said coefficient generator determines a respective term of each coefficient by combining each new sample upon receipt with the mathematical function associated with the new sample and the coefficient, and wherein, for each coefficient, said coefficient generator updates the coefficient by adding the respective term to a previous value of the coefficient, wherein the function is a Fourier transform and the mathematical function associated with each coefficient and signal is a trigonometric function, wherein to correct the coefficients to represent a correct sample sequence, said coefficient generator corrects the coefficients based on a rotating reference system, and wherein the corrected coefficients corrected by the coefficient generator are related to the updated coefficients updated by the coefficient generator according to the equations $$A'i=Ai*\cos((i*2*\pi)/N)+Bi*\sin((i*2*\pi)/N)$$

$$B'i=Bi*\cos((i*2*\pi)/N)-Ai*\sin((i*2*\pi)/N)$$

where $A'_i$ and $B'_i$ are the correct updated coefficients, $A_i$ and $B_i$ are updated coefficients.

7. A method for continuously determining the coefficients of a function representative of an input signal based on a predetermined plurality of samples of the input signal, where each sample has an associated sample number and the value of each coefficient is calculated based on a mathematical function having an associated angle variable that is based on the sample number associated with each sample, the method comprising the steps of:

A. obtaining a complete set of coefficients, C, for a set of samples;

B. receiving a new sample;

C. calculating coefficient contribution for the new sample;

D. obtaining coefficient contribution for the oldest sample;

E. calculating updated coefficients as C—oldest sample contribution+new sample contribution;

F. calculating corrected coefficients from the updated coefficients by replacing the angle in the mathematical function associated with each coefficient with an angle that corresponds to an appropriate sample number reflecting removal of the oldest sample and addition of the new sample to the calculation of the coefficients; and G. repeating steps B through G.

8. A method according to claim 7, further comprising the step of storing each of the samples as they are received in a memory device.

9. A method for continuously determining the coefficients of a function representative of an input signal based on a predetermined plurality of samples of the input signal where each sample has an associated sample number and the value of each coefficient is calculated based on a mathematical function having an associated angle variable that is based on the sample number associated with each sample, the method comprising steps of:
   A. obtaining a complete set of coefficients, C, for a set of samples;
   B. receiving a new sample;
   C. storing the sample in a memory device;
   D. calculating coefficient contribution for the new sample;
   E. obtaining coefficient contribution for the oldest sample;
   F. calculating updated coefficients as C—oldest sample contribution+new sample contribution;
   G. calculating corrected coefficients from the updated coefficients by replacing the angle in the mathematical function associated with each coefficient with an angle that corresponds to an appropriate sample number reflecting removal of the oldest sample and addition of the new sample to the calculation of the coefficients; and
   H. repeating steps B through H,
   wherein after said receiving step B has received a new sample and said calculating updated coefficients step F has updated the coefficients based on the new sample, and said calculating corrected coefficients step G has corrected the coefficients, said method further comprises outputting the coefficients.

10. A method for continuously determining the coefficients of a function representative of an input signal based on a predetermined plurality of samples of the input signal where each sample has an associated sample number and the value of each coefficient is calculated based on a mathematical function having an associated angle variable that is based on the sample number associated with each sample, the method comprising the steps of:
   A. obtaining a complete set of coefficients, C, for a set of samples;
   B. receiving a new sample;
   C. calculating coefficient contribution for the new sample;
   D. obtaining coefficient contribution for the oldest sample;
   E. calculating updated coefficients as C—oldest sample contribution+new sample contribution;
   F. calculating corrected coefficients from the updated coefficients by replacing the angle in the mathematical function associated with each coefficient with an angle that corresponds to an appropriate sample number reflecting removal of the oldest sample and addition of the new sample to the calculation of the coefficients and
   G. repeating steps B through G,
   wherein the function representing of the input signal is a Fourier transform, and wherein the mathematical function from which each coefficient is calculated is a trigonometric function.

11. A method for continuously determining the coefficients of a function representative of an input signal based on a predetermined plurality of samples of the input signal where each sample has an associated sample number and the value of each coefficient is calculated based on a mathematical function having an associated angle variable that is based on the sample number associated with each sample, the method comprising the steps of:
   A. obtaining a complete set of coefficients, C, for a set of samples
   B. receiving a new sample;
   C. calculating coefficient contribution for the new sample;
   D. obtaining coefficient contribution for the oldest sample;
   E. calculating updated coefficients as C—oldest sample contribution+new sample contribution;
   F. calculating corrected coefficients from the updated coefficients by replacing the angle in the mathematical function associated with each coefficient with an angle that corresponds to an appropriate sample number reflecting removal of the oldest sample and addition of the new sample to the calculation of the coefficients;
   G. outputting the preselected coefficient each time the coefficient is updated; and
   H. repeating steps B through H.

12. An apparatus for determining coefficients of a function representative of an input signal based on samples of the input signal, wherein said apparatus comprises a coefficient generator which provides the coefficients after each sample, the coefficient generator comprising:
   a receiver for receiving a new sample; and
   a learning model processor, the learning model processor being trained with predetermined coefficients and predetermined samples to map new coefficients to the new sample, the receiver being connected with the learning model processor wherein the receiver is capable of providing the new sample to the learning model processor.

13. The apparatus of claim 12 wherein the learning model processor comprises a neural network processor.

14. The apparatus of claim 12 wherein the learning model processor comprises at least one of a neural network integrated circuit chip and a fuzzy logic processor chip.

15. The apparatus of claim 12 wherein the learning model processor comprises a fuzzy logic processor.

16. Computer program products for determining coefficients of a function representative of an input signal based on samples of the input signal, wherein said computer program products comprise a coefficient generator which provides the coefficients after each sample, the coefficient generator comprising an executable learning model code, the learning model code being trained with predetermined coefficients and predetermined samples to map new coefficients to a new sample.

17. The computer program products of claim 16 wherein the learning model code comprises a neural network code.

18. The computer program products of claim 16 wherein the learning model code comprises a fuzzy logic code.

19. A method of determining coefficients of a function representative of an input signal based on samples of the input signal, wherein a complete set of coefficients is generated for each sample, the method comprising the steps of:
   providing predetermined sets of samples and predetermined sets of coefficients;
   training a learning model with the predetermined sets of samples and predetermined sets of coefficients to map coefficients for samples;
   providing a new sample to the learning model; and
   permitting the learning model to derive coefficients for the new sample.

20. The method of claim 19 wherein the coefficients comprise Fourier transform coefficients.

21. A method of designing systems for deriving coefficients of a function representative of an input signal based on samples of the input signal, wherein the system includes at least one of hardware and software, the method comprising the steps of: providing predetermined sets of samples and predetermined sets of coefficients; creating a training set having the predetermined sets of samples as inputs and the predetermined sets of coefficients as outputs; using a genetic algorithm to determine the mapping between the inputs and the outputs by:
   a) generating a population of chromosomes encoding the mapping;
   b) generating candidate mapping solutions in the form of at least one of hardware descriptions and software descriptions,
   c) associating the chromosomes with members of the descriptions;
   d) evaluating the goodness of the results when the inputs are presented to each candidate mapping solution;
   e) selecting the best chromosomes and combining the best chromosomes to obtain new chromosomes for testing as new candidate solutions; and
   f) repeating steps a) to f) until a solution mapping is found which has low error below imposed requirements.

22. Method of determining new values of a subset of Fourier coefficients from previous values of a subset of coefficients and values of a subset of recently received samples, the method comprising the steps of:
   providing a learning model processor; and
   training the learning model processor with inputs of predetermined subsets of Fourier coefficients and outputs of subsequent predetermined subsets of Fourier coefficients wherein the learning model is capable of generating subsets of Fourier coefficients mapped to inputs of subsets of Fourier coefficients.

23. A computer implemented method of designing apparatus for deriving coefficients of a function representative of an input signal based on samples of the input signal, the method comprising the steps of:
   a) creating a generation of a randomly selected chromosomes;
   b) matching each chromosome to a circuit model;
   c) assigning input values to each circuit model wherein the input values are determined by a predetermined sample and at least one of
      a predetermined set of coefficients and
      a predetermined set of coefficient updates;
   d) providing specifications of a target response;
   e) deriving circuit model responses and comparing the model responses against specifications of the target response;
   f) ranking each circuit model according to how close the circuit response is to the target response;
   g) generating a new population of circuit models comprising the circuit models having the highest ranking in the previous generation;
   h) swapping of parts of the chromosomes randomly and flipping bits of chromosome randomly;
   i) repeating the process for several generations, to achieve better circuit models; and
   j) stopping after at least one of
      a predetermined number of generations and
      when the closeness between the circuit model response and target response become sufficiently close.

24. The method of claim 23 wherein the coefficients are for a Fourier series.

* * * * *

UNITED STATES PATENT AND TRADEMARK OFFICE
CERTIFICATE OF CORRECTION

PATENT NO. : 6,922,712 B2
DATED : July 26, 2005
INVENTOR(S) : Pelton et al.

It is certified that error appears in the above-identified patent and that said Letters Patent is hereby corrected as shown below:

Column 10,
Lines 56 and 57, the equation should read:

$$\text{-- } C' = S2+S3+S4+S5+S6+S6+S8+S9 = (S1 + S2 + S3 + S4 + S5 + S6 + S6 + S8) - S1 + S1' = C + S1' - S1 \quad (10) \text{ --.}$$

Signed and Sealed this

Eighteenth Day of October, 2005

JON W. DUDAS
*Director of the United States Patent and Trademark Office*